(12) United States Patent
Kim et al.

(10) Patent No.: US 10,440,625 B2
(45) Date of Patent: Oct. 8, 2019

(54) METHOD AND APPARATUS FOR PERFORMING HANDOVER IN INTER-VEHICLE COMMUNICATION SYSTEM

(71) Applicant: LG ELECTRONICS INC., Seoul (KR)

(72) Inventors: Heejin Kim, Seoul (KR); Jiwon Kang, Seoul (KR); Kitae Kim, Seoul (KR); Kilbom Lee, Seoul (KR); Kungmin Park, Seoul (KR)

(73) Assignee: LG Electronics Inc., Seoul (KR)

( * ) Notice: Subject to any disclaimer, the term of this patent is extended or adjusted under 35 U.S.C. 154(b) by 37 days.

(21) Appl. No.: 15/753,780

(22) PCT Filed: Jun. 2, 2016

(86) PCT No.: PCT/KR2016/005864
§ 371 (c)(1),
(2) Date: Feb. 20, 2018

(87) PCT Pub. No.: WO2017/034131
PCT Pub. Date: Mar. 2, 2017

(65) Prior Publication Data
US 2018/0270727 A1     Sep. 20, 2018

Related U.S. Application Data

(60) Provisional application No. 62/207,931, filed on Aug. 21, 2015.

(51) Int. Cl.
*H04W 36/24* (2009.01)
*H04W 36/22* (2009.01)
(Continued)

(52) U.S. Cl.
CPC ............ *H04W 36/24* (2013.01); *H04W 4/44* (2018.02); *H04W 24/10* (2013.01);
(Continued)

(58) Field of Classification Search
None
See application file for complete search history.

(56) References Cited

U.S. PATENT DOCUMENTS

| 2012/0176925 A1* | 7/2012 | Hwang | H04W 24/10 370/252 |
| 2013/0114434 A1* | 5/2013 | Muruganathan | H04W 16/14 370/252 |

(Continued)

FOREIGN PATENT DOCUMENTS

| KR | 10-2008-0102201 A | 11/2008 |
| KR | 10-2011-0138961 A | 12/2011 |

(Continued)

*Primary Examiner* — Andrew C Oh
(74) *Attorney, Agent, or Firm* — Dentons US LLP

(57) ABSTRACT

In the present invention, provided is a method for performing handover, by a first terminal, in an inter-vehicle communication system. Here, the method for performing handover, by the first terminal, may comprise the steps of: receiving information on a first bias value from a base station; receiving information on a second bias value from a second terminal; and performing handover on the basis of the first bias value and the second bias value. Here, the first terminal and the second terminal are configured in the same terminal group, the first bias value is a bias value for the terminal group, and the second bias value may be a bias value for the first terminal.

15 Claims, 14 Drawing Sheets

(51) Int. Cl.
  *H04W 24/10* (2009.01)
  *H04W 36/00* (2009.01)
  *H04W 36/14* (2009.01)
  *H04W 4/44* (2018.01)
  *H04W 4/40* (2018.01)
  *H04W 4/02* (2018.01)
  *H04W 4/46* (2018.01)

(52) U.S. Cl.
  CPC ... *H04W 36/0009* (2018.08); *H04W 36/0094* (2013.01); *H04W 36/14* (2013.01); *H04W 36/22* (2013.01); *H04W 4/02* (2013.01); *H04W 4/40* (2018.02); *H04W 4/46* (2018.02); *H04W 36/03* (2018.08)

(56) References Cited

U.S. PATENT DOCUMENTS

| | | | | |
|---|---|---|---|---|
| 2013/0163529 A1* | 6/2013 | Chen | H04W 72/082 | 370/329 |
| 2013/0229953 A1* | 9/2013 | Nam | H04W 72/0426 | 370/280 |
| 2013/0281089 A1* | 10/2013 | Chandrasekhar | H04W 24/02 | 455/434 |
| 2014/0198659 A1* | 7/2014 | Vargas Bautista | H04W 28/08 | 370/236 |
| 2014/0302853 A1* | 10/2014 | Militano | H04W 36/0055 | 455/436 |
| 2015/0009848 A1* | 1/2015 | Miki | H04W 72/1231 | 370/252 |
| 2015/0023319 A1* | 1/2015 | Park | H04W 36/0055 | 370/331 |
| 2015/0065192 A1* | 3/2015 | Sun | H04W 16/26 | 455/522 |
| 2015/0111609 A1* | 4/2015 | Koutsimanis | H04W 52/143 | 455/522 |
| 2015/0124733 A1* | 5/2015 | Lim | H04W 52/244 | 370/329 |
| 2015/0131599 A1* | 5/2015 | Xue | H04W 72/1226 | 370/329 |
| 2015/0146638 A1* | 5/2015 | Ohwatari | H04W 52/143 | 370/329 |
| 2015/0163718 A1* | 6/2015 | Ji | H04W 36/30 | 370/332 |
| 2015/0195057 A1* | 7/2015 | Tan | H04J 11/005 | 370/252 |
| 2015/0208423 A1* | 7/2015 | Manssour | H04W 52/244 | 370/329 |
| 2015/0249961 A1* | 9/2015 | Wang | H04W 36/0083 | 370/329 |
| 2015/0373614 A1* | 12/2015 | Tie | H04W 36/22 | 455/437 |
| 2016/0057666 A1* | 2/2016 | Pang | H04W 24/10 | 370/252 |
| 2016/0286561 A1* | 9/2016 | Huang | H04L 1/00 | |
| 2017/0041085 A1* | 2/2017 | Kwon | H04W 72/0453 | |

FOREIGN PATENT DOCUMENTS

| | | |
|---|---|---|
| KR | 10-2012-0071881 A | 7/2012 |
| KR | 10-2012-0080514 A | 7/2012 |

* cited by examiner

E-UMTS (a) Control-Plane Protocol Stack (b) User-Plane Protocol Stack (a)

(b)

MeNB : Macro eNodeB
PeNB : Pico eNodeB
FeNB : Femto eNodeB

MUE : Macro UE
PUE : Pico UE
FUE : Femto UE

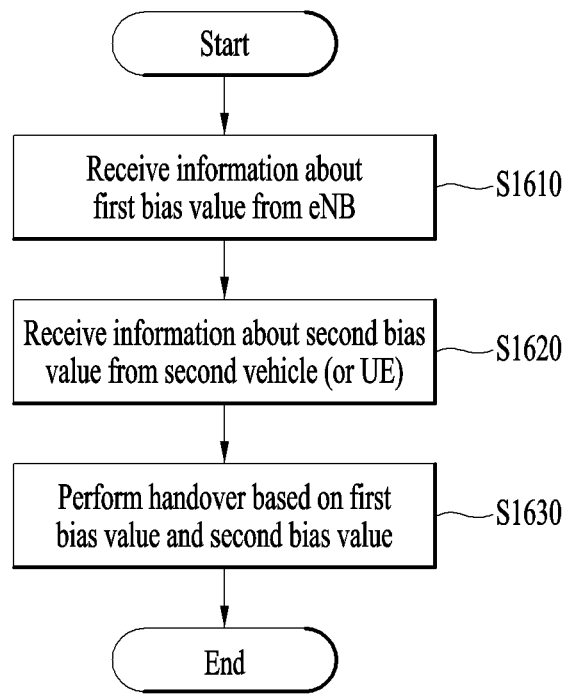
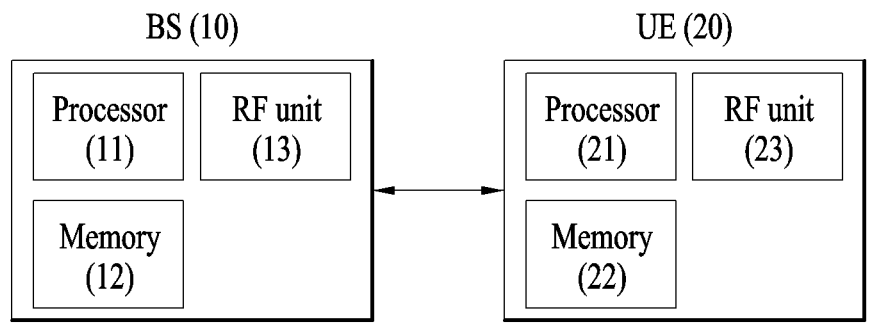

METHOD AND APPARATUS FOR PERFORMING HANDOVER IN INTER-VEHICLE COMMUNICATION SYSTEM

This application is a 35 USC § 371 National Stage entry of International National Application No. PCT/KR2016/005864, filed on Jun. 2, 2016, which claims priority to U.S. Provisional Application No. 62/207,931, filed on Aug. 21, 2015, which are incorporated by reference in their entirety herein.

TECHNICAL FIELD

The present invention relates to a wireless communication system and, more particularly, to a wireless communication system applied to vehicular communication.

BACKGROUND ART

A brief description will be given of a 3rd Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, a new technological evolution is required to achieve future competitiveness. Specifically, cost reduction per bit, increased service availability, flexible use of frequency bands, a simplified structure, an open interface, appropriate power consumption of UEs, etc. are required.

In addition, recently, interest in a vehicular communication system has increased. More specifically, interest in a method of applying wireless communication technology and position tracking technology (global positioning system (GPS)) to a vehicle and providing a service such as vehicle diagnosis, theft detection, route guidance or traffic service provision to a driver who uses the vehicle in real time has increased. At this time, there is a need for methods of efficiently performing vehicular communication in consideration of the appearance and mobility of a vehicle and interference with another vehicle in a vehicular communication system.

DETAILED DESCRIPTION OF THE INVENTION

Technical Problems

An object of the present invention is to provide a method of performing handover in a vehicle-to-vehicle communication system and an apparatus therefor.

Another object of the present invention is to provide a method of controlling a handover scheme in units of groups in consideration of an environment of densely distributed vehicles.

Another object of the present invention is to provide a method of solving an over-traffic problem for a cell based on mobility and density of vehicles.

Technical Solutions

According to an aspect of the present invention, provided herein is a method of performing handover by a first User Equipment (UE). The method may include receiving information about a first bias value from a Base Station (BS), receiving information about a second bias value from a second UE, and performing handover based on the first bias value and the second bias value. The first UE and the second UE may be set as the same UE group. The first bias value may be a bias value for the UE group and the second bias value may be a bias value for the first UE.

According to another aspect of the present invention, provided herein is a first User Equipment (UE) for performing handover. The first UE may include a transceiver module configured to transmit and receive information to and from an external device, and a processor configured to control the transceiver module. The processor may receive information about a first bias value from a Base Station (BS) through the transceiver module, receive information about a second bias value from a second UE through the transceiver module, and perform handover based on the first bias value and the second bias value. The first UE and the second UE may be set as the same UE group. The first bias value may be a bias value for the UE group and the second bias value may be a bias value for the first UE.

The following may be commonly applied to the method and the apparatus for performing handover in a vehicle-to-vehicle communication system according to an embodiment of the present invention In accordance with an embodiment of the present invention, the second UE may be a representative UE of the UE group.

In accordance with an embodiment of the present invention, the second UE may receive UE attribute information from each of all UEs in the UE group.

In accordance with an embodiment of the present invention, the second UE may determine the second bias value for the first UE based on UE attribute information of all the UEs.

In accordance with an embodiment of the present invention, the second UE may further determine a bias value of each of all the UEs in the UE group.

In accordance with an embodiment of the present invention, the UE attribute information may include at least one of cell signal strength, traffic information, or mobility information.

In accordance with an embodiment of the present invention, the first bias value may be transmitted to the first UE through a higher-layer message.

In accordance with an embodiment of the present invention, the first bias value may be transmitted to all UEs in the UE group and may be equally set for all the UEs in the UE group.

In accordance with an embodiment of the present invention, the UE group may be configured based on at least one of UE location distribution, demanded traffic capacity, or mobility.

In accordance with an embodiment of the present invention, the UE group may be configured by the BS.

In accordance with an embodiment of the present invention, the second bias value may be set based on a first ID indicator and the first ID indicator may indicate the first UE in the UE group.

In accordance with an embodiment of the present invention, an ID indicator indicating each UE may be allocated to each of UEs in the UE group and the ID indicator for each of the UEs may be allocated by the BS or the second UE.

In accordance with an embodiment of the present invention, the information about the second bias value may be information configured by a mapping table including the first ID indicator and the second bias value and the first UE may acquire the information about the second bias value based on the first ID indicator from the information configured by the mapping table.

Advantageous Effects

In accordance with the present invention, a method of performing handover in a vehicle-to-vehicle communication system and an apparatus therefor are provided.

In accordance with the present invention, a method of controlling a handover scheme in units of groups in consideration of an environment in which vehicles are densely distributed is provided.

In accordance with the present invention, a method of solving an over-traffic problem for a cell based on mobility and density of vehicles is provided.

Effects according to the present invention are not limited to what has been particularly described hereinabove and other advantages not described herein will be more clearly understood by persons skilled in the art from the following detailed description of the present invention.

DESCRIPTION OF DRAWINGS

FIG. 16 is a flowchart illustrating a method of selecting a distributed antenna according to an embodiment of the present invention.

FIG. 17 is a block diagram of a UE and a BS according to an embodiment of the present invention.

BEST MODE FOR CARRYING OUT THE INVENTION

Figure 1:
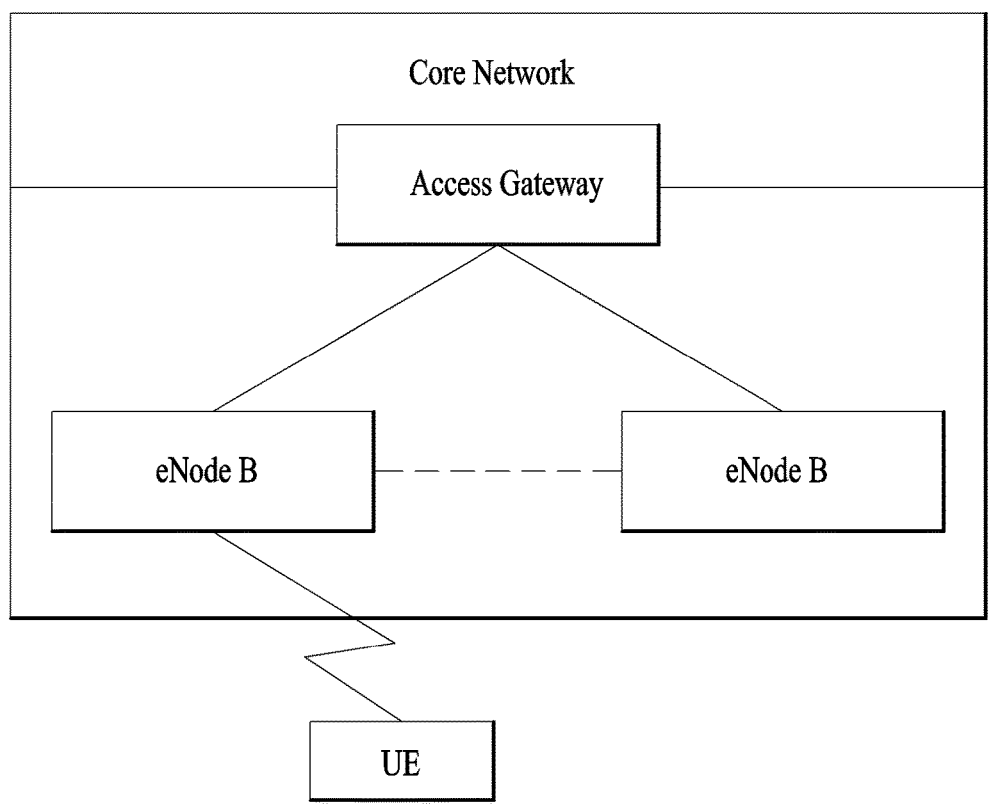
FIG. 1 is a diagram schematically illustrating a network structure of an E-UMTS as an exemplary radio communication system according to an embodiment of the present invention.

Reference will now be made in detail to the preferred embodiments of the present invention, examples of which are illustrated in the accompanying drawings. The detailed description set forth below in connection with the appended drawings is intended as a description of exemplary embodiments and is not intended to represent the only embodiments in which the concepts explained in these embodiments can be practiced. The detailed description includes details for the purpose of providing an understanding of the present invention. However, it will be apparent to those skilled in the art that these teachings may be implemented and practiced without these specific details.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

It should be noted that specific terms disclosed in the present invention are proposed for the convenience of description and better understanding of the present invention, and the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

The embodiments of the present invention can be supported by the standard documents disclosed in any one of wireless access systems, such as an IEEE 802 system, a 3rd Generation Partnership Project (3GPP) system, 3GPP Long Term Evolution (LTE) and LTE-Advanced (LTE-A) systems, and a 3GPP2 system. That is, the steps or portions, which are not described in order to make the technical spirit of the present invention clear, may be supported by the above documents. In addition, all the terms disclosed in the present document may be described by the above standard documents.

The following technology can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied with wireless (or radio) technology such as UTRA (Universal Terrestrial Radio Access) or CDMA2000. TDMA may be embodied with wireless (or radio) technology such as GSM (Global System for Mobile communications)/GPRS (General Packet Radio Service)/EDGE (Enhanced Data Rates for GSM Evolution). OFDMA may be embodied with wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA).

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In the entire specification, when a certain portion "includes" a certain component, this indicates that the other components are not excluded, but may be further included unless specially described. The terms "unit", "-or/er" and "module" described in the specification indicate a unit for processing at least one function or operation, which may be implemented by hardware, software and a combination thereof.

Figure 2:
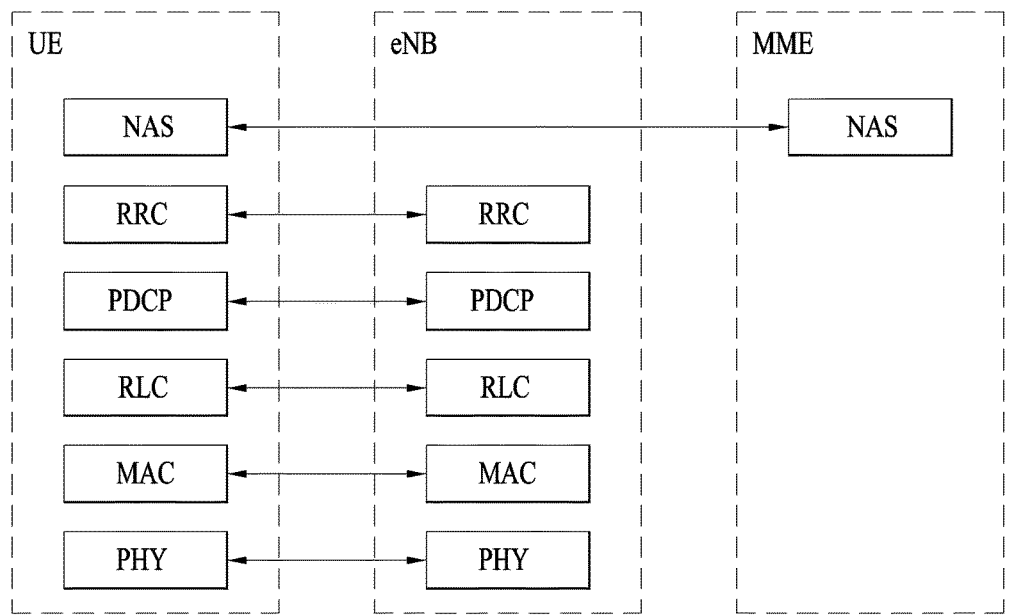
FIG. 2 is a diagram illustrating structures of a control plane and a user plane of a radio interface protocol between a UE and an E-UTRAN based on the 3GPP radio access network specification according to an embodiment of the present invention.
Figure 2:
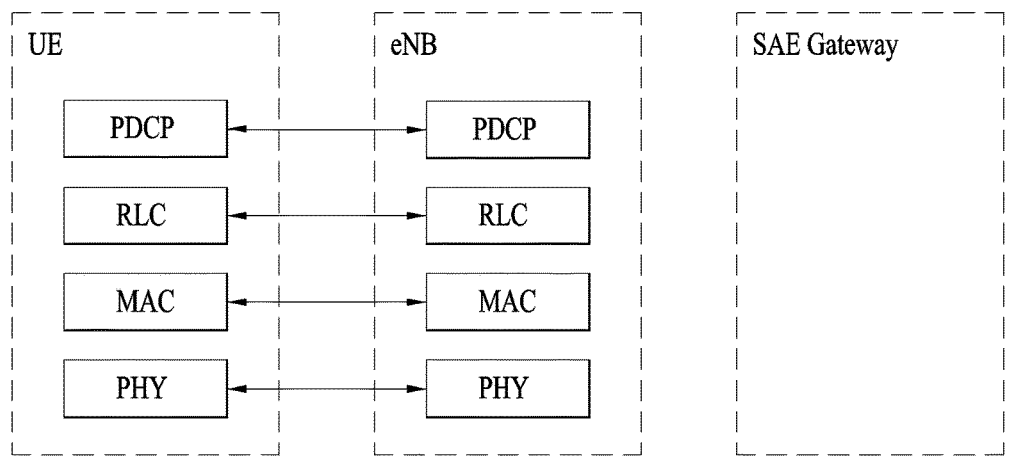

FIG. 2 is a diagram illustrating structures of a control plane and a user plane of a radio interface protocol between a UE and an E-UTRAN based on the 3GPP radio access network specification according to an embodiment of the present invention.

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
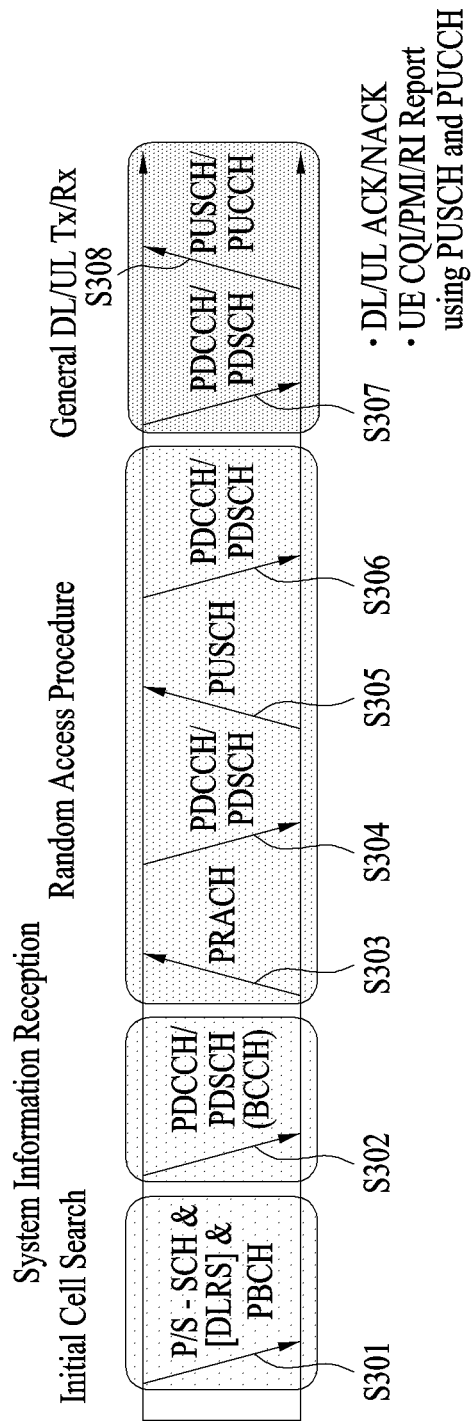
FIG. 3 is a diagram illustrating physical channels used in a 3GPP system and a general signal transmission method using the same according to an embodiment of the present invention.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
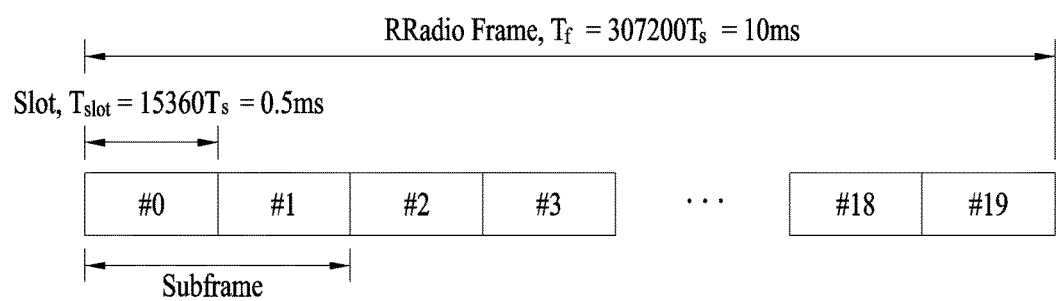
FIG. 4 is a diagram illustrating the structure of a radio frame used in an LTE system according to an embodiment of the present invention.

FIG. 4 illustrates a structure of a radio frame used in the LTE system.

Referring to FIG. 4, a radio frame is 10 ms (327200×Ts) long and divided into 10 equal-sized subframes. Each subframe is 1 ms long and further divided into two slots. Each time slot is 0.5 ms (15360×Ts) long. Herein, Ts represents a sampling time and Ts=1/(15 kHz×2048)=3.2552×10-8 (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 5:
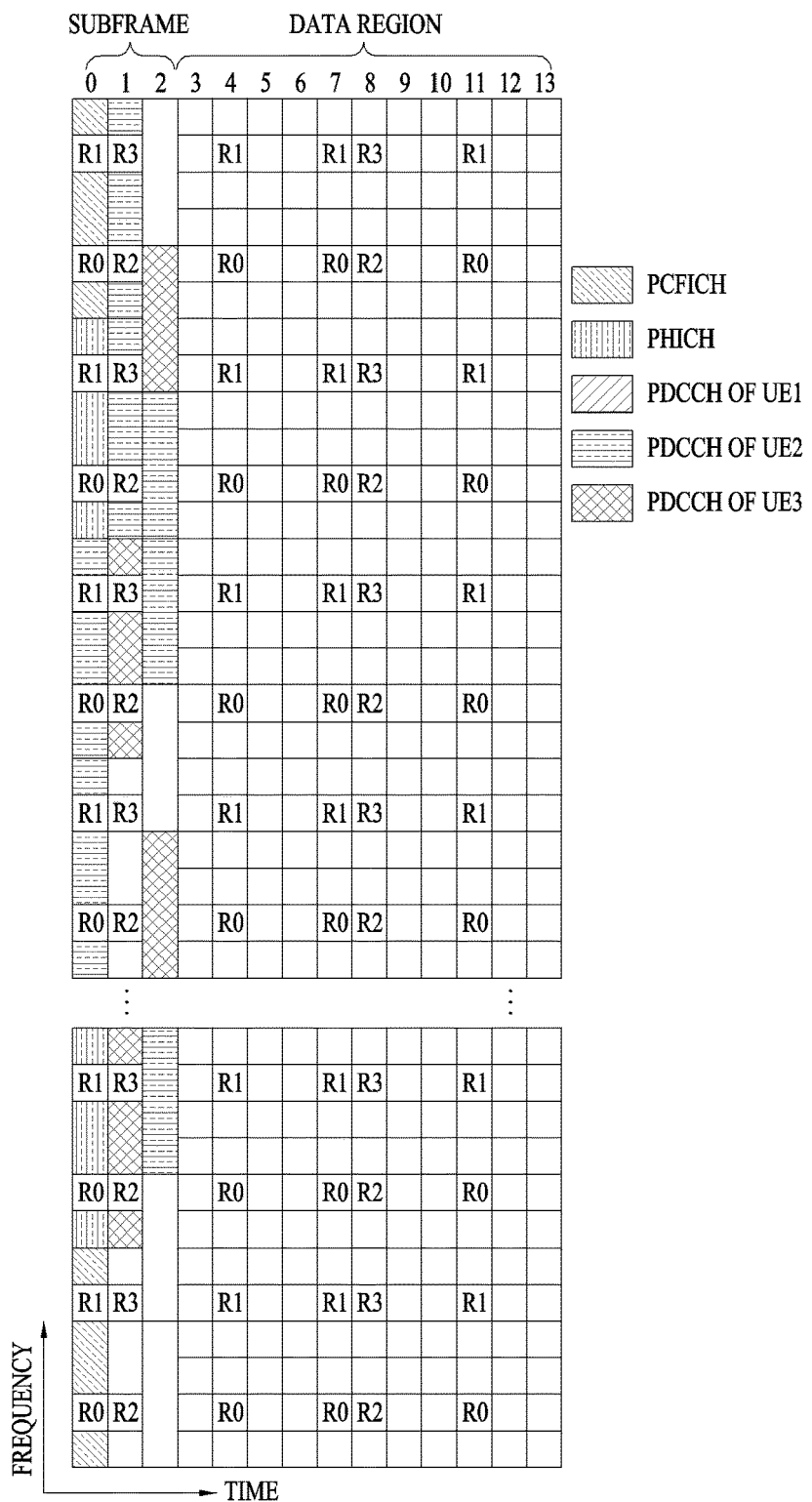
FIG. 5 is a diagram showing the structure of a downlink radio frame used in an LTE system according to an embodiment of the present invention.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
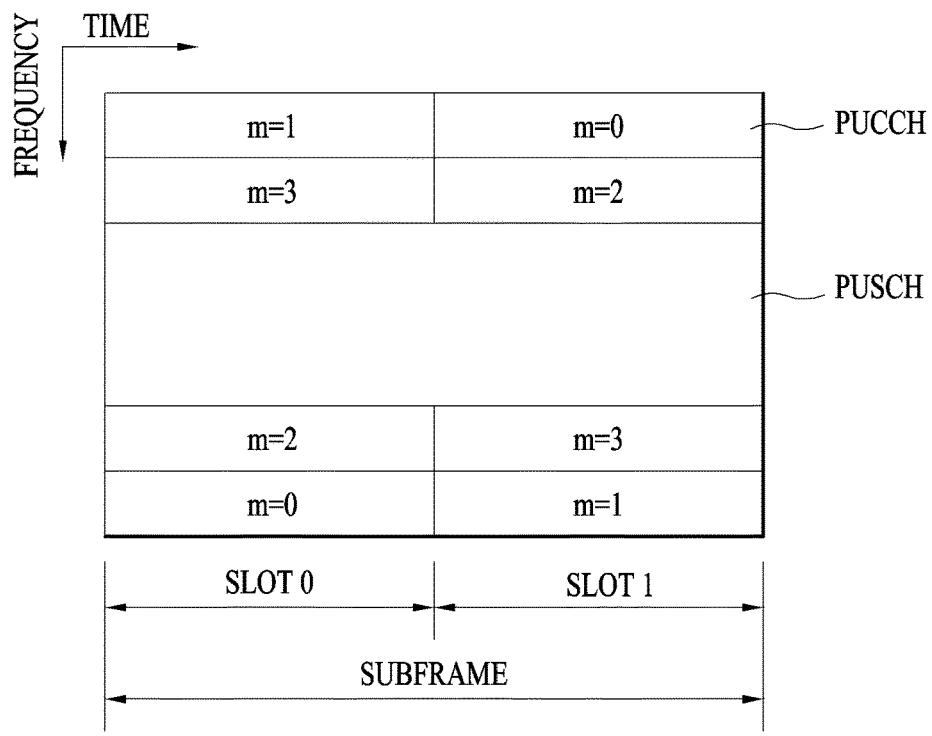
FIG. 6 is a diagram showing the structure of an uplink radio frame used in an LTE system according to an embodiment of the present invention.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 6.

Figure 7:
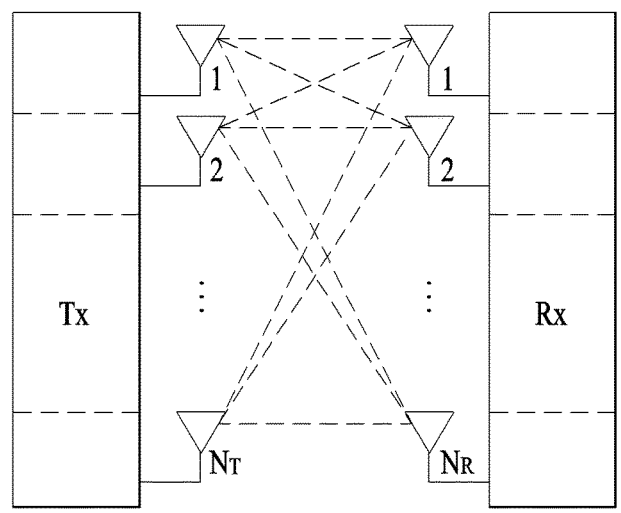
FIG. 7 is a diagram showing the structure of a general multiple input multiple output (MIMO) communication system according to an embodiment of the present invention.

FIG. 7 is a diagram showing the structure of a general multiple input multiple output (MIMO) communication system according to an embodiment of the present invention.

MIMO refers to a method using multiple transmit antennas and multiple receive antennas to improve data transmission/reception efficiency. Namely, a plurality of antennas is used at a transmitter or a receiver of a wireless communication system so that capacity can be increased and performance can be improved. MIMO may also be referred to as multi-antenna in this disclosure.

MIMO technology does not depend on a single antenna path in order to receive a whole message. Instead, MIMO technology completes data by combining data fragments received via multiple antennas. The use of MIMO technology can increase data transmission rate within a cell area of a specific size or extend system coverage at a specific data transmission rate. MIMO technology can be widely used in mobile communication terminals and relay nodes. MIMO technology can overcome a limited transmission capacity encountered with the conventional single-antenna technology in mobile communication.

FIG. 7 illustrates the configuration of a typical MIMO communication system. A transmitter has NT transmit (Tx) antennas and a receiver has NR receive (Rx) antennas. Use of a plurality of antennas at both the transmitter and the receiver increases a theoretical channel transmission capacity, compared to the use of a plurality of antennas at only one of the transmitter and the receiver. Channel transmission capacity increases in proportion to the number of antennas. Therefore, transmission rate and frequency efficiency are increased. Given a maximum transmission rate Ro that may be achieved with a single antenna, the transmission rate may be increased, in theory, to the product of Ro and a transmission rate increase rate Ri in the case of multiple antennas, as indicated by Equation 1. Ri is the smaller of NT and NR.

$$R_i = \min(N_T, N_R) \quad \text{[Equation 1]}$$

For example, a MIMO communication system with four Tx antennas and four Rx antennas may theoretically achieve a transmission rate four times that of a single antenna system. Since the theoretical capacity increase of the MIMO wireless communication system was verified in the mid-1990s, many techniques have been actively developed to increase data transmission rate in real implementations. Some of these techniques have already been reflected in various wireless communication standards including standards for 3rd generation (3G) mobile communications, next-generation wireless local area networks, etc.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transmission rate.

Communication in a MIMO system will be described in detail through mathematical modeling. It is assumed that NT Tx antennas and NR Rx antennas are present as illustrated in FIG. 7. Regarding a transmission signal, up to NT pieces of information can be transmitted through the NT Tx antennas, as expressed as the vector of Equation 2 below.

$$s = [s_1, s_2, \ldots, s_{N_T}]^T \quad \text{[Equation 2]}$$

Individual pieces of the transmission information $s_1, s_2, \ldots, s_{N_T}$ may have different transmit powers. If the individual transmit powers are denoted by $P_1, P_2, \ldots, P_{N_T}$, respectively, then the transmission power-controlled transmission information may be given as shown in Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector $\hat{s}$ may be expressed as shown in Equation 4 below, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, NT transmission signals $x_1, x_2, \ldots, x_{N_T}$ to be actually transmitted may be configured by multiplying the transmission power-controlled information vector $\hat{s}$ by a weight matrix W. The weight matrix functions to appropriately distribute the transmission information to individual antennas according to transmission channel states, etc. The transmission signals $x_1, x_2, \ldots, x_{N_T}$ are represented as a vector X, as shown in Equation 5 below. Here, $w_{ij}$ denotes a weight of an i-th Tx antenna and a j-th piece of information. W is referred to as a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

Generally, the physical meaning of the rank of a channel matrix is the maximum number of different pieces of information that can be transmitted on a given channel. Therefore, the rank of a channel matrix is defined as the smaller of the number of independent rows and the number of independent columns in the channel matrix. Accordingly, the rank of the channel matrix is not larger than the number of rows or columns of the channel matrix. The rank of the channel matrix H (rank(H)) is restricted as shown in Equation 6 below.

$$\text{rank}(H) \leq \min(N_T, N_R) \quad \text{[Equation 6]}$$

A different piece of information transmitted in MIMO is referred to as a transmission stream or stream. A stream may also be called a layer. It is thus concluded that the number of transmission streams is not larger than the rank of channels, i.e. the maximum number of different pieces of transmittable information. Thus, the channel matrix H is expressed as shown in Equation 7 below.

$$\text{\# of streams} \leq \text{rank}(H) \leq \min(N_T, N_R) \quad \text{[Equation 7]}$$

"# of streams" denotes the number of streams. It should be noted that one stream may be transmitted through one or more antennas.

One or more streams may be mapped to a plurality of antennas in many ways. This method may be described as follows depending on MIMO schemes. If one stream is transmitted through a plurality of antennas, this may be regarded as spatial diversity. When a plurality of streams is transmitted through a plurality of antennas, this may be spatial multiplexing. A hybrid scheme of spatial diversity and spatial multiplexing may be contemplated.

It is expected that the future-generation mobile communication standard, LTE-A will support Coordinated Multi-Point (CoMP) transmission in order to increase data rate, compared to the legacy LTE standard. CoMP refers to transmission of data to a UE through cooperation from two or more eNBs or cells in order to increase communication performance between a UE located in a shadowing area and an eNB (a cell or sector).

CoMP transmission schemes may be classified into CoMP-Joint Processing (CoMP-JP) called cooperative MIMO characterized by data sharing, and CoMP-Coordinated Scheduling/Beamforming (CoMP-CS/CB).

In DL CoMP-JP, a UE may instantaneously receive data simultaneously from eNBs that perform CoMP transmission and may combine the received signals, thereby increasing reception performance (Joint Transmission (JT)). In addition, one of the eNBs participating in the CoMP transmission may transmit data to the UE at a specific time point (Dynamic Point Selection (DPS)).

In contrast, in downlink CoMP-CS/CB, a UE may receive data instantaneously from one eNB, that is, a serving eNB by beamforming.

In UL CoMP-JP, eNBs may receive a PUSCH signal from a UE at the same time (Joint Reception (JR)). In contrast, in UL CoMP-CS/CB, only one eNB receives a PUSCH from a UE. Herein, cooperative cells (or eNBs) may make a decision as to whether to use CoMP-CS/CB.

Hereinbelow, a description of channel state information (CSI) reporting will be given. In the current LTE standard, a MIMO transmission scheme is categorized into open-loop MIMO operated without CSI and closed-loop MIMO operated based on CSI. Especially, according to the closed-loop MIMO system, each of the eNB and the UE may be able to perform beamforming based on CSI in order to obtain multiplexing gain of MIMO antennas. To acquire CSI from the UE, the eNB transmits RSs to the UE and commands the UE to feed back CSI measured based on the RSs through a PUCCH or a PUSCH.

CSI is divided into three types of information: an RI, a PMI, and a CQI. First, RI is information on a channel rank as described above and indicates the number of streams that can be received via the same time-frequency resource. Since RI is determined by long-term fading of a channel, it may be generally fed back at a cycle longer than that of PMI or CQI.

Second, PMI is a value reflecting a spatial characteristic of a channel and indicates a precoding matrix index of the eNB preferred by the UE based on a metric of signal-to-interference plus noise ratio (SINR). Lastly, CQI is information indicating the strength of a channel and indicates a reception SINR obtainable when the eNB uses PMI.

An advanced system such as an LTE-A system considers additional multi-user diversity through multi-user MIMO (MU-MIMO). Due to interference between UEs multiplexed in an antenna domain in MU-MIMO, the accuracy of CSI may significantly affect interference with other multiplexed UEs as well as a UE that reports the CSI. Accordingly, more accurate CSI than in single-user MIMO (SU-MIMO) should be reported in MU-MIMO.

In this context, the LTE-A standard has determined to separately design a final PMI as a long-term and/or wideband PMI, W1, and a short-term and/or subband PMI, W2.

For example, a long-term covariance matrix of channels expressed as Equation 8 may be used for hierarchical codebook transformation that configures one final PMI with W1 and W2.

$$W = \text{norm}(W1\,W2) \quad \text{[Equation 8]}$$

In Equation 1, W2 is a short-term PMI, which is a codeword of a codebook reflecting short-term channel information, W is a codeword of a final codebook, and norm(A) is a matrix obtained by normalizing each column of matrix A to 1.

Conventionally, the codewords W1 and W2 are given as Equation 9.

$$W1(i) = \begin{bmatrix} X_i & 0 \\ 0 & X_i \end{bmatrix}, \text{ where } X_i \text{ is } Nt/2 \text{ by } M \text{ matrix} \quad \text{[Equation 9]}$$

$$W2(j) = \overbrace{\begin{bmatrix} e_M^k & e_M^l & & e_M^m \\ & & \cdots & \\ \alpha_j e_M^k & \beta_j e_M^l & & \gamma_j e_M^m \end{bmatrix}}^{r \text{ columns}} \text{ (if rank} = r\text{),}$$

where $1 \leq k, l, m \leq M$ and $k, l, m$ are integer.

In Equation 9, the codewords are designed so as to reflect correlation characteristics between established channels, if cross-polarized antennas are densely arranged, for example, the distance between adjacent antennas is equal to or less than half a signal wavelength. The cross-polarized antennas may be divided into a horizontal antenna group and a vertical antenna group and the two antenna groups are co-located, each having the property of a uniform linear array (ULA) antenna.

Therefore, the correlations between antennas in each group have the same linear phase increment property and the correlation between the antenna groups is characterized by phase rotation. Since a codebook is quantized values of channels, it is necessary to design a codebook reflecting channel characteristics. For convenience of description, a rank-1 codeword designed in the above manner may be given as Equation 10.

In Equation 9, the codebook configurations are designed to reflect channel correlation properties generated when cross polarized antennas are used and when a space between antennas is dense, for example, when a distance between adjacent antennas is less than a half of signal wavelength. The cross polarized antennas may be categorized into a horizontal antenna group and a vertical antenna group. Each antenna group has the characteristic of a Uniform Linear Array (ULA) antenna and the two groups are co-located.

Accordingly, a correlation between antennas of each group has characteristics of the same linear phase increment and a correlation between antenna groups has characteristics of phase rotation. Consequently, since a codebook is a value obtained by quantizing a channel, it is necessary to design a codebook such that characteristics of a channel are reflected. For convenience of description, a rank-1 codeword generated by the aforementioned configurations is shown in Equation 10 below.

$$W1(i) * W2(j) = \begin{bmatrix} X_i(k) \\ \alpha_j X_i(k) \end{bmatrix} \quad \text{[Equation 10]}$$

In Equation 10, a codeword is expressed as an $N_T \times 1$ vector where NT is the number of Tx antennas and the codeword is composed of an upper vector $X_i(k)$ and a lower vector $\alpha_j X_i(k)$, representing the correlation characteristics of the horizontal and vertical antenna groups, respectively. $X_i(k)$ is expressed as a vector having the linear phase increment property, reflecting the correlation characteristics between antennas in each antenna group. As a representative example, a discrete Fourier transform (DFT) matrix may be used.

An advanced system such as an LTE-A system considers achievement of an additional multi-user diversity by the use of MU-MIMO. Due to the existence of interference channels between UEs multiplexed in an antenna domain in MU-MIMO, the accuracy of CSI may significantly affect interference with other multiplexed UEs as well as a UE that reports the CSI. Accordingly, more accurate CSI than in SU-MIMO should be reported in MU-MIMO.

In CoMP JT, because a plurality of eNBs transmits the same data to a specific UE through cooperation, the eNBs may be theoretically regarded as forming a MIMO system with antennas distributed geographically. That is, even when MU-MIMO is implemented in JT, highly accurate CSI is required to avoid interference between CoMP-scheduled UEs as in a single cell MU-MIMO operation. The same applies to CoMP CB. That is, to avoid interference with a serving cell caused by a neighbor cell, accurate CSI is needed. In general, a UE needs to report an additional CSI feedback in order to increase the accuracy of CSI feedback. The CSI feedback is transmitted on a PUCCH or a PUSCH to an eNB.

Hereinafter, a vehicular communication system based on the above-described wireless communication system will be described.

Figure 8:
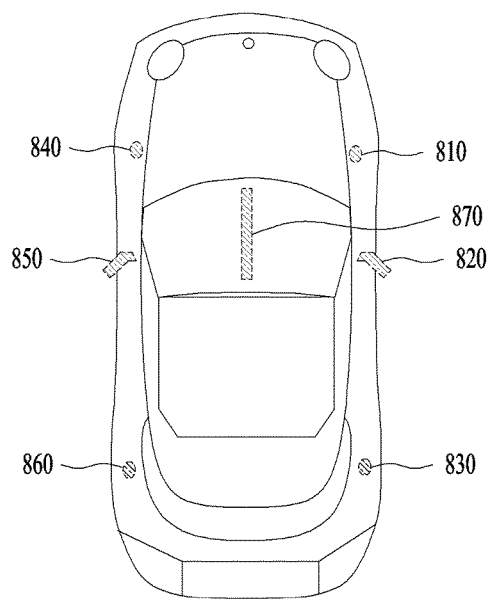
FIG. 8 is a diagram showing a vehicle including a plurality of antenna arrays according to an embodiment of the present invention.
Figure 8:
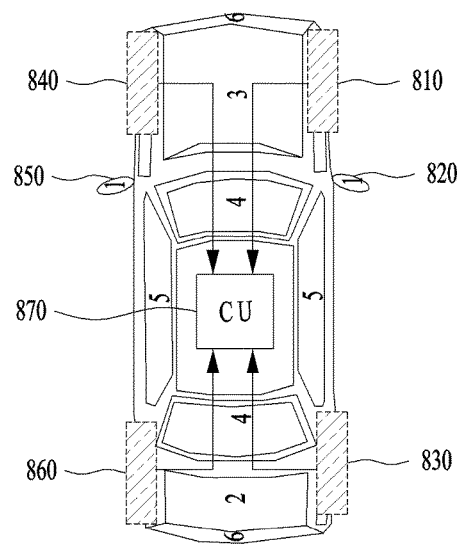

FIG. 8 is a diagram showing a vehicle including a plurality of antenna arrays according to an embodiment of the present invention. The number of uses of the above-described wireless communication system and service categories using the wireless communication system have increased. At this time, unlike an existing static service, need to provide high data throughput, high data rate and high quality of service (QoS) to user equipments (UEs) or users moving at a high speed has increased.

For example, a wireless communication system needs to support wireless services having good quality to moving UEs when a plurality of UEs or users (hereinafter, collectively referred to as a UE) desires to view multimedia content while using public transportation or when a plurality of UEs of passengers riding in a personal vehicle traveling on an expressway uses different wireless communication services.

However, a conventional wireless communication system has some limits in provision of a service to a UE in consideration of high-speed movement or mobility. At this time, in order to support a service, a system network needs to be revolutionized. In addition, a new system for maintaining compatibility with an existing network infrastructure without influencing the existing network infrastructure needs to be designed.

At this time, for example, as described below, a large-sized antenna array may be mounted in a vehicle such that the vehicle acquires large array gain, thereby providing services having good quality to UEs located in the vehicle even in a state in which the vehicle moves at a high speed. At this time, in the vehicle, data received through a central unit (hereinafter, CU) may be relayed to the UEs located in the vehicle. At this time, a vehicular MIMO system may be considered. At this time, as described above, if a large-sized antenna array is used, the vehicle can prevent communication performance from being lowered due to penetration loss having an average value of 20 dB. In addition, since the vehicle uses receive (rx) antennas greater in number than the number of UEs using a system, large array gain can be easily obtained and reception diversity can be obtained by ensuring a distance between the receive antennas. That is, it is possible to provide a service to a UE moving at a high speed without additionally designing a network through the vehicular MIMO system.

In spite of the above-described advantages, up to now, it has been difficult to apply a vehicular MIMO system due to problems related to vehicle appearance and manufacturing system establishment. In addition, the vehicle is significantly expensive as compared to a personal portable communication device and cannot be easily improved and updated. In addition, since the vehicle should satisfy many requirements such as design concept and aeromechanical structure in addition to communication performance, the design of the vehicle may be aesthetically/aeromechanically restricted. For example, some vehicle manufacturers have used complex antennas having quality inferior to that of a single antenna in order to eliminate visual inconvenience of an existing antenna.

In order to solve spatial restriction of a large-sized antenna array in an environment in which a communication system needs to be developed, installation of a distributed antenna array system for implementing a multi-antenna-array system in a vehicle has been gradually introduced in consideration of vehicle appearance.

At this time, for example, referring to FIG. 8, a vehicle may include a plurality of antennas 810, 820, 830, 840, 850 and 860 mounted therein. At this time, the locations and number of the plurality of antennas 810, 820, 830, 840, 850 and 860 may be changed according to vehicle design. At this time, the below-described configuration is equally applicable even when the locations and number of the plurality of antennas 810, 820, 830, 840, 850 and 860 mounted in the vehicle are changed, and the present invention is not limited to the below-described embodiments. That is, the present invention is applicable to antennas having various shapes and radiation patterns according to the locations of the plurality of antennas 810, 820, 830, 840, 850 and 860.

At this time, signals for distributed antenna units (DUs) of the vehicle may be controlled through a central unit (CU) 870. That is, the CU 870 of the vehicle may control the signals for the DUs 810, 820, 830, 840, 850 and 860 mounted in the vehicle to receive a signal from a base station while maximizing reception diversity and to prevent wireless connection between the base station and the vehicle in a state in which the vehicle moves at a high speed. That is, the vehicle may be a UE having a plurality of antennas or a relay for relaying a signal. The vehicle may provide a service having good quality to a plurality of UEs located in the vehicle through control and relay of the signal received through the CU 870.

Figure 9:
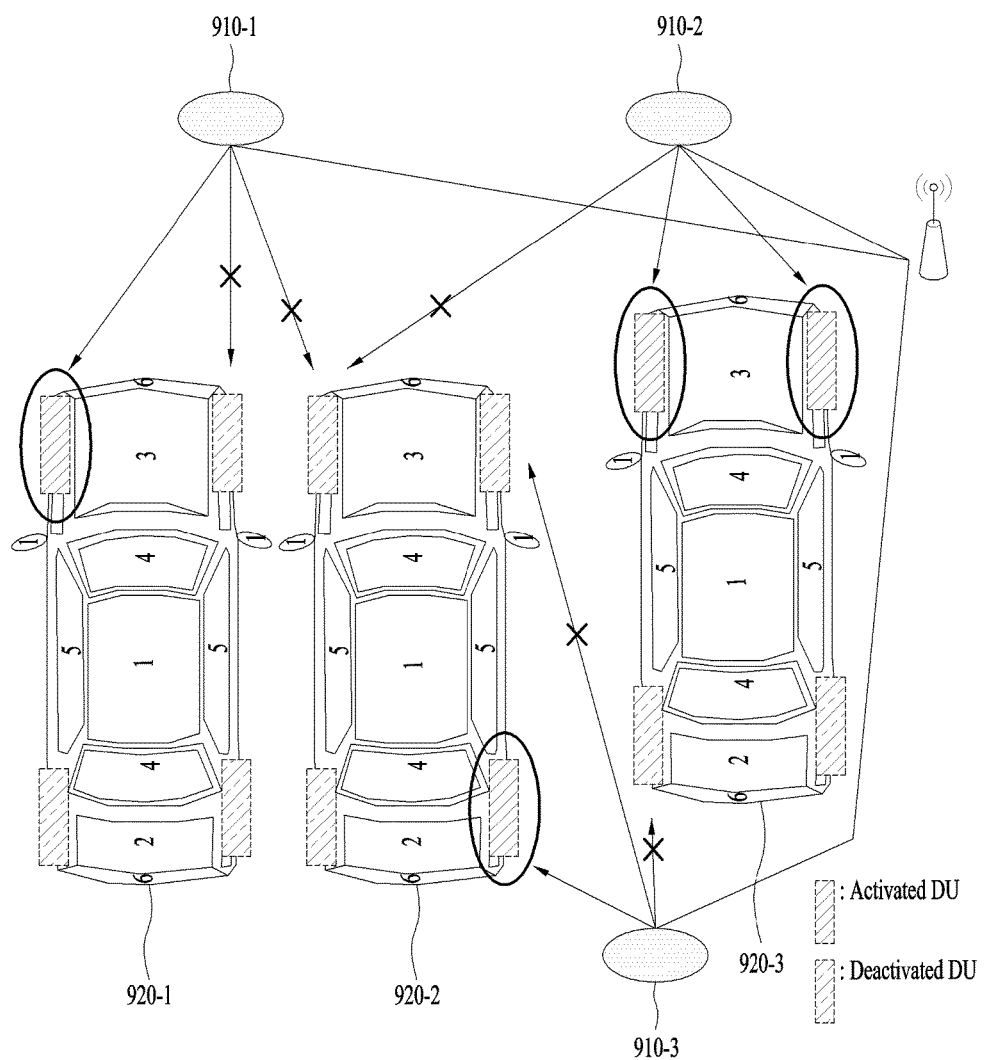
FIG. 9 is a diagram showing a method of selecting a distributed antenna unit (DU) in a state in which a plurality of vehicles is concentrated, according to an embodiment of the present invention.

FIG. 9 is a diagram showing a method of selecting a distributed antenna unit (DU) in a state in which a plurality of vehicles is concentrated, according to an embodiment of the present invention.

As described above, a vehicle may include a plurality of DUs and a CU 870 for controlling the DUs. At this time, a plurality of vehicles 920-1, 920-2 and 920-3 may be concentrated in a narrow area. For example, the plurality of vehicles 920-1, 920-2 and 920-3 may be concentrated in a narrow area upon city driving or upon a traffic jam. At this time, if the plurality of vehicles 920-1, 920-2 and 920-3 is concentrated, it may be difficult to distinguish between beams for the DUs of the vehicles due to beam sharpness. For example, if a plurality of vehicles is close to each other, the DU located at the right side of the first vehicle 920-1 may be adjacent to the DU located at the left side of the second vehicle 920-2 and thus the beams for these DUs may not be easily distinguished. That is, since DUs located adjacent to each other receive signals undergoing similar channel environments, a plurality of DUs may be likely to receive the same beam or not to receive a signal due to blocking of obstacles.

Accordingly, activation of the DUs deployed in the plurality of vehicles 920-1, 920-2 and 920-3 needs to be controlled. More specifically, the vehicles 920-1, 920-2 and 920-3 may selectively control activation or deactivation of the DUs based on the density of neighboring vehicles. For example, when a beam transmitted from a first base station 910-1 to a first vehicle 920-1 is received, the first vehicle 920-1 may activate only the DUs located at the left side of the first vehicle 920-1 and deactivate the remaining DUs of the first vehicle 920-1, to be distinguished from the adjacent second vehicle 920-2. At this time, for example, the first vehicle 920-1 may determine whether vehicles are concentrated using a position information reception unit (e.g., a GPS) or a proximity sensor. In addition, for example, whether the DUs are deactivated may be determined based on a threshold value based on density of vehicles. At this time, a threshold value may be a criterion value for determining activation or deactivation. That is, a criterion for determining whether the vehicles 920-1, 920-2 and 920-3 are concentrated may be changed and is not limited to the above-described embodiment.

In addition, the third vehicle 920-3 may activate two DUs located at the front side of the third vehicle 920-3 in order to receive the beam from the second base station 910-2. That is, the vehicles 920-1, 920-2 and 920-3 may selectively activate/deactivate the DUs thereof to distinguish the beam received through the activated DUs thereof from the beams capable of being received by adjacent vehicles. Therefore, beams passing through independent paths experiencing different clusters are received, thereby improving beam reception performance.

In addition, the vehicles may feed information on activation and deactivation of the DUs back to the base station as described above. At this time, for example, the above-described information may be fed back along with channel state information (CSI) fed back from the vehicles to the base station.

More specifically, a transmission end needs to obtain information on a channel and to accurately measure a suitable beam and gain obtained upon using the beam based on the information. At this time, in a wireless communication system, a reception end (e.g., a UE or a vehicle) may feed channel information back to the transmission end (e.g., the base station) in the form of CSI after measuring the channel.

At this time, for example, in a MIMO system, since a plurality of antennas is used, a plurality of channels may be present and CSI may be defined as a combination of sub-channels. At this time, as the number of antennas used in the MIMO system increases, a complicated format may be used. In consideration of such an environment, an implicit CSI reporting scheme or an explicit CSI reporting scheme may be used as a CSI reporting scheme. That is, an implicit CSI reporting scheme or an explicit CSI reporting scheme may be used as a CSI reporting scheme of a massive MIMO environment.

At this time, for example, the implicit CSI reporting scheme may refer to a scheme of analyzing information on a channel measured by a reception end and reporting only information substantially necessary to generate a beam, without reporting the information on the channel measured by the reception end. That is, only necessary information may be fed back based on a predefined or predetermined value.

In contrast, the explicit CSI reporting scheme may refer to a scheme of reporting information maximally approximating to a measured value to a transmission end without a process of analyzing a channel measured by a reception end. At this time, a method of quantizing a MIMO channel represented in a matrix or performing SVD operation may be used in the channel information. For example, the implicit CSI report information may include a precoding matrix index (PMI), a channel quality indicator (CQI), rank information (RI), etc. In addition, the explicit CSI report information may include channel coefficient quantization & quantization index feedback, MIMO matrix or vector quantization & quantization index feedback, channel covariance matrix feedback, Eigen matrix feedback (transmission of Eigen vectors and/or Eigen values of channel matrix), etc. At this time, the implicit CSI reporting scheme can reduce signal overhead as compared to the explicit CSI reporting scheme, since only necessary information is extracted and fed back.

At this time, in association with the CSI feedback method of a conventional wireless communication system, a UE receives a pilot signal (reference signal) for channel estimation from a base station and calculates and reports channel state information (CSI) to the base station. At this time, the base station transmits data to the UE based on the CSI fed back from the UE. At this time, in a wireless communication system, the CSI fed back by the UE may include a channel quality indicator (CQI), a precoding matrix index (PMI), a rank indicator (RI), etc.

At this time, CQI feedback may be radio channel quality information provided to the base station for the purpose of providing information regarding which modulation and coding scheme (MCS) is applied when the base station transmits data (for link adaptation). When radio quality between the base station and the UE is high, the UE may feed back a high CQI value and the base station may apply a relatively high modulation order and a low channel coding rate and transmit data. Otherwise, the UE may feed back a low CQI value and the base station may apply a relatively low modulation order and a high channel coding rate and transmit data.

In addition, PMI feedback may be feedback of preferred precoding matrix information provided to the base station for the purpose of providing information regarding which MIMO precoding is applied when the base station includes multiple antennas mounted therein. The UE may estimate a downlink MIMO channel between the base station and the UE from a pilot signal and provide information indicating which MIMO precoding is applied to the base station through PMI feedback. In a conventional wireless communication system, only linear MIMO precoding representable in a matrix in a configuration of a PMI was considered. At this time, the base station and the UE share a codebook composed of a plurality of precoding matrices and each MIMO precoding matrix in the codebook has a unique index. Accordingly, the UE may feed back an index corresponding to a most preferred MIMO precoding matrix in the codebook as PMI, thereby minimizing the amount of feedback information of the UE.

Lastly, RI feedback may be feedback of information on the number of preferred transport layers provided to the base station for the purpose of providing information on the number of transport layers preferred by the UE when each of the base station and the UE includes multiple antennas mounted therein and thus multilayer transmission through spatial multiplexing is possible. At this time, since the base station should know which precoding is applied to each layer according to the number of transport layers, the RI may be closely related with the PMI. For example, in configuration of PMI/RI feedback, a PMI codebook may be configured based on single-layer transmission and then a PMI may be defined and fed back per layer. However, in such a method, the amount of PMI/RI feedback information is significantly increased as the number of transport layers increases. Accordingly, in a conventional wireless communication system, a PMI codebook according to the number of transport layers was defined. That is, N matrices having a size of Nt×R may be defined in the codebook, for R-layer transmission (here, R denotes the number of layers, Nt denotes the number of transmit antenna ports, and N denotes the size of a codebook). At this time, the size of the codebook may be defined regardless of the number of transport layers. As a result, when the PMI/RI is defined in such a structure, the number R of transport layers becomes equal to the rank value of the precoding matrix (Nt×R matrix) and thus may be referred to as a rank indicator (RI).

In addition, in a conventional wireless communication system, CSI may be obtained in an overall system frequency region or some frequency regions (e.g., Wideband CSI, Subband CSI). Particularly, in a system using orthogonal frequency division multiple access (OFDMA) technology, CSI of some frequency regions (e.g., subband) preferred per UE may be obtained and fed back.

At this time, the below-described PMI/RI may not be limited to the index value of a precoding matrix represented in an Nt×R matrix and the rank value of a precoding matrix like a PMI/RI of a wireless communication system. In addition, the below-described PMI indicates preferred MIMO precoder information among MIMO precoders applicable to a transmission end and the precoder is not limited to a linear precoder represented in a matrix as in a conventional wireless system. In addition, the below-described RI has a broader meaning than the RI in the conventional wireless communication system and may include all feedback information indicating the number of preferred transport layers without being limited thereto.

In addition, for example, the PMI value may not include only one index. For example, in the conventional wireless communication system, a final PMI is divided into W1 which is a long term and/or wideband (WB) PMI and W2 which is a short term and/or subband (SB) PMI, thereby designing a PMI having a dual structure. At this time, when the final PMI is W, W=W1*W2 or W=W2*W1 may be defined. In addition, for example, in an LTE-A system, if the number of transmit antenna ports is 8 or if the number of transmit antenna ports is 4 and alternativeCodeBookEnabledFor4TX-rl2=TRUE is configured through RRC signaling, a final MIMO precoding matrix may be derived by only combining two indices (WB PMI & SB PMI).

In addition, in a wireless communication system, in single user-MIMO (SU-MIMO), only data of one UE may be scheduled in the same time/frequency domain. That is, if information is transmitted to and received from one UE by MIMO, only scheduling information of one UE may be included in one time/frequency domain. In contrast, in multiuser-MIMO (MU-MIMO), data of a plurality of UEs may be scheduled together in one time/frequency domain. At this time, in MU-MIMO, the data is multiplexed in the same time/frequency domain, thereby obtaining additional gain. However, if the plurality of UEs is scheduled together, co-channel interference is generated by the UEs, thereby deteriorating system performance. At this time, the UE may feed CSI thereof back to the base station and the base station may schedule a user based on the CSI fed back from the plurality of UEs, thereby optimizing a system.

However, if a new UE is further scheduled in an SU-MIMO state or an MU-MIMO state, in a conventional wireless communication system, influence of interference between users generated by scheduling the new UE in the system may not be considered. That is, since only channel information considering SU-MIMO is fed back and the base station only checks the channel state of each user and cannot acquire information on interference to be experienced by each user in MU-MIMO, it may be difficult to reduce influence of interference between UEs. Accordingly, when SU-MIMO is switched to MU-MIMO or if MU-MIMO operates, multiplexing gain capable of being obtained by supporting multiple UEs needs to be sufficiently considered.

At this time, in consideration of the above-described situation, if a plurality of vehicles (or UEs) (hereinafter, collectively referred to as vehicles) is present, each vehicle may feed combination information related to the number and locations of DUs activated in the vehicle and channel state information back to a base station. That is, interference with other vehicles and reception performance may be changed according to the number and locations of DUs activated in each vehicle and each vehicle needs to feed information on the activated DUs back to the base station. At this time, the base station may acquire an effective channel of each vehicle based on the received channel state information and the activated DU information and transmit data. At this time, as described above, in a state in which vehicles are concentrated, the base station needs to acquire more accurate channel information. Hereinafter, a method of feeding back activated DU information at a vehicle will be described.

As an example, the method may be identically applied even to communication of a single vehicle in which a plurality of DUs is densely distributed. More specifically, configuration and definition of each DU may be differently applied. In an example, the structure of a communication device (or system) may be divided into a Remote Radio Head (RRH) including a Radio Frequency (RF) stage, a Modem (PHY/MAC/PDCP/RRC/NAS), and an AP. According to the structure and function of a DU, the DU may be defined as one communication device (or system) or a normal antenna unit.

As an example, when the DU is configured only by the RF stage or the RRH, the DU may perform the function of the normal antenna unit. On the other hand, when the DU has a structure of the RF stage or more, the DU may be defined as an independent communication device (or system). In this case, the structure of the RF stage or more may refer to a structure including the function of RRH and a part of the function of the modem. Alternatively, the structure of the RF stage or more may refer to a structure including the function of the RRH, the function of the modem, and the function of the AP. That is, the DU may be an antenna unit included in a vehicle, which performs a simple antenna function. Alternatively, the DU may be defined as a virtual UE as one communication device (or system).

In this case, if the DU is defined as a virtual UE as one communication device (or system), the DU may be equally applied even to a situation in which virtual UEs are densely distributed in communication of a single vehicle.

In addition, the DU may include a plurality of antennas. As an example, if the DU is defined as a virtual UE as one communication device (or system), on/off of a plurality of antennas included in the DU may be individually controlled by the DU as the virtual UE. That is, each of a plurality of DUs in a single-vehicle communication system may require a method of performing communication in a situation in which the DUs are densely distributed as virtual UEs. In this case, each of the DUs may include a plurality of antennas. In addition, each of the DUs may individually control on/off of each of the plural antennas.

Although the following description will be given focusing on a vehicle including the DU, the description may be identically applied to a UE including a plurality of antennas or other devices which include a plurality of antennas and operate based on the antennas. In addition, the description may be identically applied even to communication of a single vehicle as the case in which the DU operates as a virtual UE and is not limited to the following embodiments.

In addition, the following description may be identically applied even to an individual DU included in one vehicle.

Figure 10:
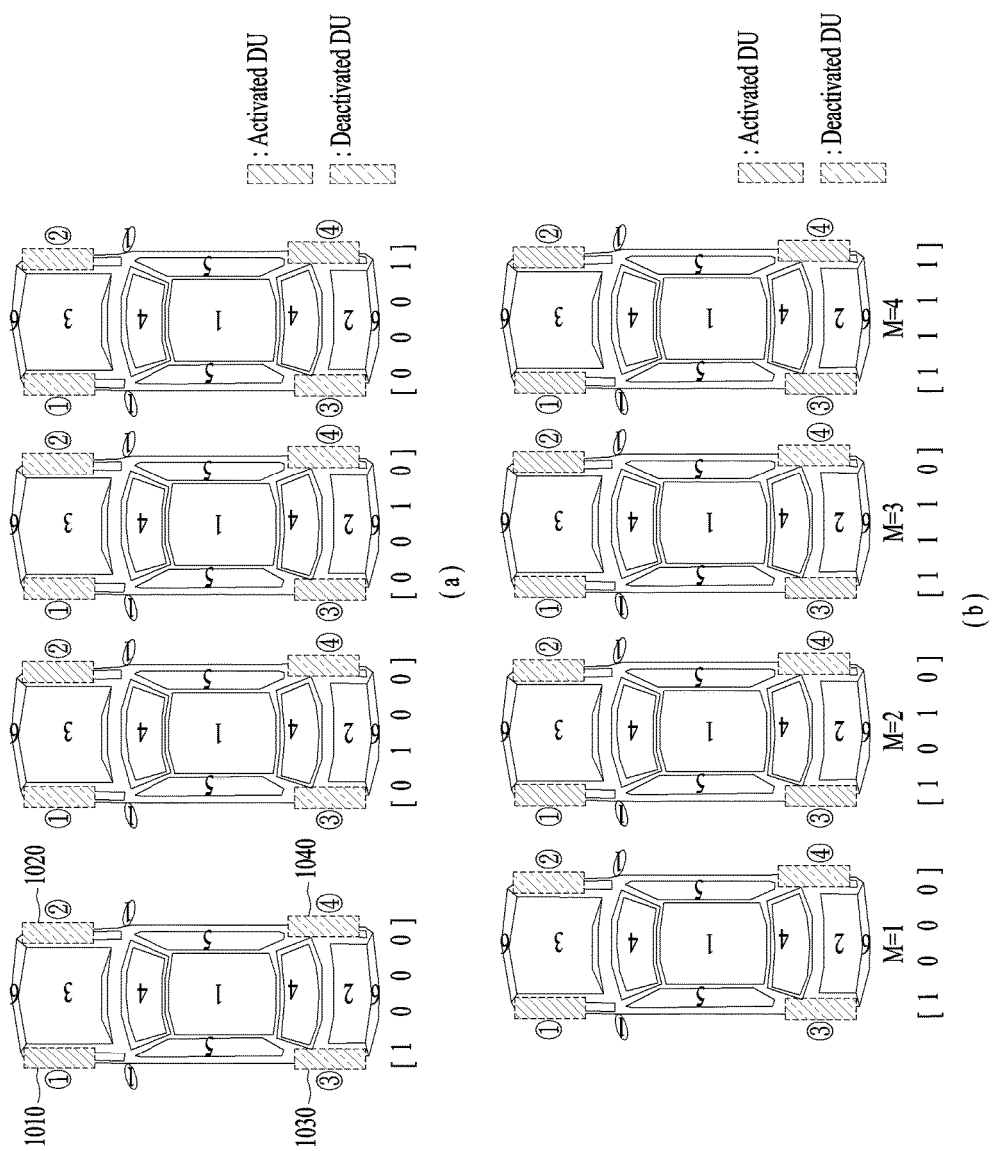
FIG. 10 is a diagram showing an example of a DU selection combination according to an embodiment of the present invention.

FIG. 10 is a diagram showing an example of a DU selection combination according to an embodiment of the present invention. As described above, an implicit CSI reporting scheme or an explicit CSI reporting scheme may be used as a CSI reporting scheme. At this time, if a plurality of DUs is included in a vehicle and activation of DUs is selectable, effective channel information may be changed according to the number and locations of activated DUs.

More specifically, in a conventional communication system, if a plurality of antennas is present and all antennas are activated, a UE may feed back CSI. However, as described above, if a plurality of vehicles is concentrated or if a plurality of UEs or devices is concentrated, cooperative communication may be performed in consideration of mutual interference. At this time, each UE may select DUs to be activated from among the plurality of DUs included therein, thereby reducing interference with the other vehicles or UEs. At this time, channel information to be reported by the vehicle may be changed according to the number and locations of activated DUs among the plurality of DUs and thus a channel information reporting method considering the same may be necessary.

At this time, for example, the channel information reported by the vehicle may include channel state information and DU index set information combined according to the number and locations of activated DUs among the plurality of DUs included in the vehicle. At this time, the channel state information may be explicitly reported in consideration of the DU index set information. At this time, for example, the explicitly reported channel state information may include at least one of the channel coefficient, quantization & quantization index feedback, MIMO matrix or vector quantization & quantization index feedback, channel covariance matrix feedback and Eigen matrix feedback (transmission of Eigen vectors and/or Eigen values of channel matrix). In addition, for example, the channel information fed back by the vehicle may include at least one of the DU index set information and the channel state information. That is, the channel information fed back by the vehicle may include both or one of the DU index set information and the channel state information, without being limited to the above-described embodiment.

In addition, the channel information fed back by the vehicle may include explicit channel state information in consideration of the DU index set as described above, without being limited thereto. For example, the vehicle may report the DU index set information and implicit channel state information to the base station and the base station may acquire final effective channel information using the implicit channel state information and the DU index set information.

In addition, the base station may receive the channel information of each of the plurality of vehicles. That is, the base station may receive the DU index set information and the channel state information fed back by each of the plurality of vehicles. At this time, the base station may acquire effective channel information using the received DU index set information and channel state information. The base station may transmit data to the vehicles using the acquired effective channel information.

At this time, the DU index set information may differ between the vehicles. As described above, the DU index set information may be differently set based on the number and locations of activated DUs among the plurality of DUs included in the vehicle.

For example, referring to FIG. 10(a), the vehicle may include four DUs 1010, 1020, 1030 and 1040 at corner regions thereof. At this time, the number and locations of DUs included in the vehicle may be differently set and is not limited to the above-described embodiment. In addition, for example, each vehicle may feed the number and locations of DUs included therein back to the base station. In addition, for example, each vehicle may feed information on the number and locations of activated DUs among the DUs included therein back to the base station. In addition, for example, the base station may acquire the DU information of each vehicle through higher layer signaling or another path, without being limited to the above-described embodiment.

At this time, for example, FIG. 10(a) shows the case where only one of the four DUs 1010, 1020, 1030 and 1040 included in the vehicle is activated. At this time, different combinations may be configured according to selected DUs. More specifically, whether each of the DUs 1010, 1020, 1030 and 1040 included in the vehicle is activated may be indicated through a matrix or an index. At this time, if only the DU located at the front left side of the vehicle is activated, the DU index may be [1 0 0 0]. If only one DU included in the vehicle is activated using the same method, the DU index may be represented by [0 1 0 0], [0 0 1 0] or [0 0 0 1].

At this time, for example, the DU index set information may include the above-described four pieces of DU index information. In addition, for example, the vehicle may feed information indicating that only one of the four DUs 1010, 1020, 1030 and 1040 is activated back to the base station. At this time, the vehicle may include the four pieces of DU index information in the DU index set information and feed the DU index set information back to the base station along with the channel state information. At this time, the base station may acquire effective channel information based on the DU index information and perform downlink data transmission.

In addition, for example, the vehicle may feed the DU index set information considering both the number and locations of DUs included therein back to the base station. At this time, for example, the number of cases of selecting $M_i(M_i \leq N_i)$ DUs to be activated among the DUs included in one vehicle is shown in Equation 11 below.

$$_{N_i}C_{M_i}$$ [Equation 11]

Accordingly, the total number of cases of DU combinations selectable from one vehicle is shown in Equation 12 below.

$$\sum_{M_i=0}^{N_i} {}_{N_i}C_{M_i} = 2^{N_i}$$ [Equation 12]

In addition, for example, if $M_i=0$, the vehicle may be deactivated not to cause interference with the other vehicles. At this time, for example, the vehicle may feed the DU index set information including $2^{N_i}$ pieces of DU index information back to the base station. The base station may determine an effective channel using the fed-back DU index set information and channel state information.

In addition, for example, FIG. 10(*b*) shows DU index information which is differently set according to the number and locations of activated DUs among the four DUs 1010, 1020, 1030 and 1040 of the vehicle. That is, the DU index may be determined based on the number and locations of activated DUs among the DUs included in the vehicle and the DU index information may be fed back to the base station as DU index set information.

At this time, for example, in FIG. 10(*a*), only one of the four DUs may be activated in one vehicle. At this time, as described above, the DU index set may be given as {[1 0 0 0], [0 1 0 0], [0 0 1 0], [0 0 0 1]}. At this time, the vehicle may transmit the channel state information to the base station as an explicit CSI report. At this time, for example, the explicit CSI report may include MIMO matrix quantization. At this time, MIMO matrix quantization is shown in Equation 13 below.

$$H = \begin{bmatrix} h_1 \\ h_2 \\ \vdots \\ h_{N_i} \end{bmatrix}$$ [Equation 13]

At this time, $h_i$ elements configuring the matrix may be a scalar value by the number of antennas in each DU, quantization resolution, etc. In addition, for example, $h_i$ may be a row vector or a column vector. At this time, for example, if $h_i$ is represented in the form of a column vector, a MIMO matrix may be represented by horizontally stacking $h_i$, not vertically stacking $h_i$ as in Equation 13. That is, the base station, which has received the explicitly reported CSI and the selectable DU index set, may combine and use the effective channel information of the vehicle using the information for downlink transmission. At this time, for example, in Equation 13, the effective channel information capable of being extracted from explicit feedback and the DU index set [0 1 0 0] may become $H_{eff}=[h_2]$. That is, the base station may extract some (rows or columns) of the explicit CSI based on the DU index set information fed back from each vehicle, form effective channel information of each vehicle and perform data transmission using the effective channel information.

Figure 11:
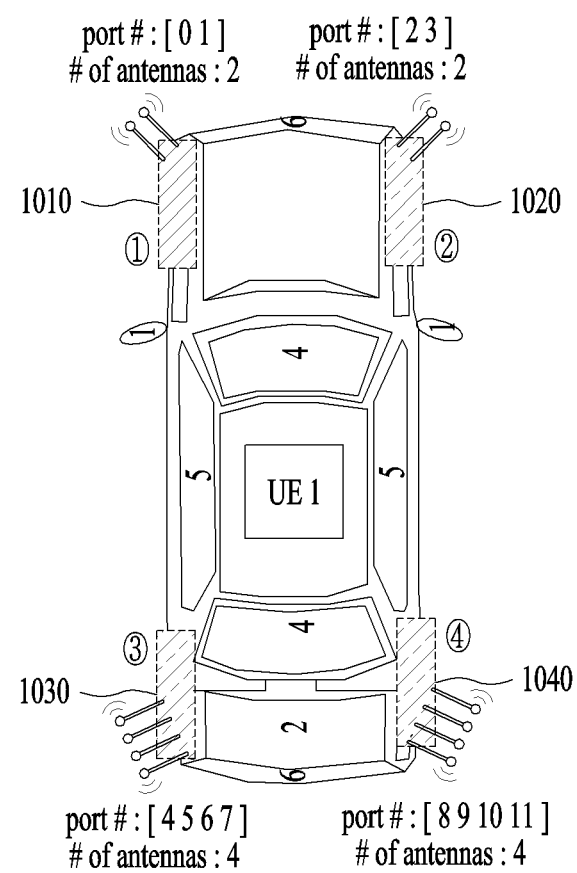
FIG. 11 is a diagram showing a DU including a plurality of antenna ports according to an embodiment of the present invention.

FIG. 11 is a diagram showing a DU including a plurality of antenna ports according to an embodiment of the present invention. As described above, each vehicle may include DU index set information and channel state information in channel information and feed the channel information back to the base station.

At this time, for example, the DU index set may be configured as antenna port group (sub grouping or antenna port grouping) information per DU.

More specifically, referring to FIG. 11, one vehicle may include four DUs composed of 2/2/4/4 physical antennas. At this time, the total number of physical antennas included in each DU may be 12. At this time, for example, the vehicle may generate channel state information based on the total number of physical antennas. At the same time, the vehicle may feed information indicating the antenna port of the DU, to which each physical antenna is mapped, back to the base station through the DU index set information.

For example, the vehicle may include information such as DU1 (port #={0,1}, number of antennas=2), DU2 (port #={2,3}, number of antennas=2) in the DU index set and feed the information back to the base station. At this time, the base station may map the antenna port index using the received DU index set information and the channel state information and transmit data while controlling interference between the vehicles.

Figure 12:
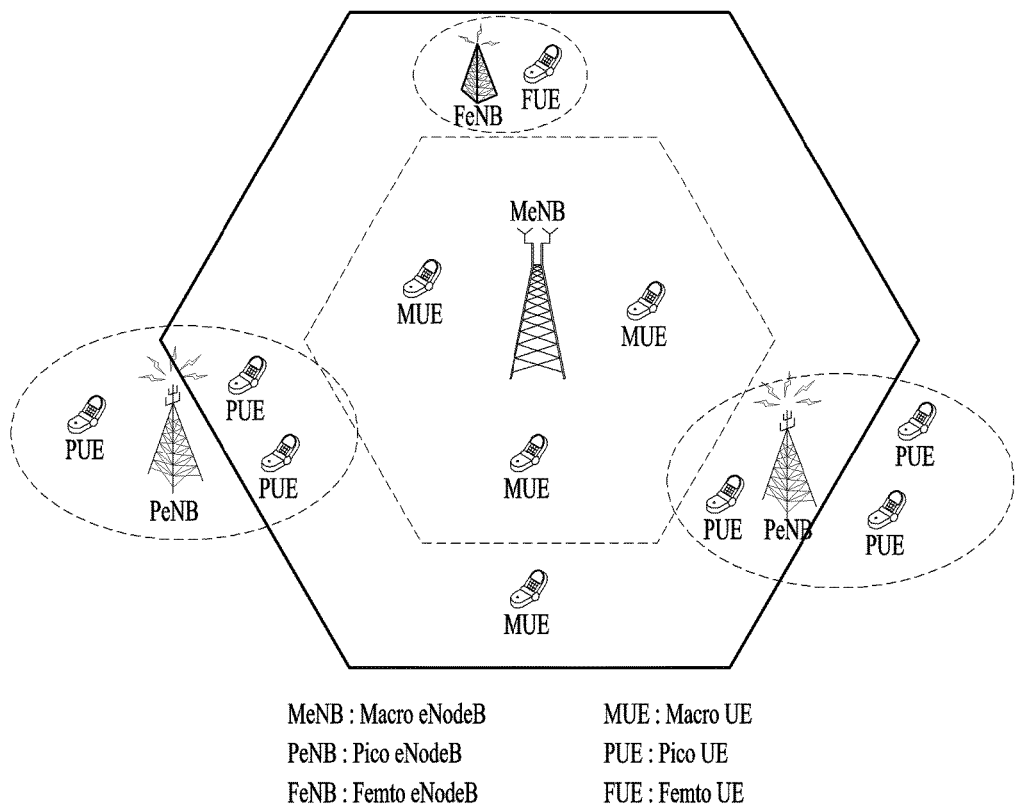
FIG. 12 is a diagram illustrating an example of heterogeneous network deployment.

FIG. 12 is a diagram illustrating an example of heterogeneous network deployment.

As various communication systems have emerged, a heterogeneous environment in which various cells coexist in a short range is considered. More specifically, to stably ensure a data service such as a multimedia service in a future-generation mobile communication system, a hierarchical cell structure or a heterogeneous cell structure in which pico cells or femto cells as micro cells for low-power/short-range communication are co-existent in a macro cell based homogeneous network has been introduced.

Referring to FIG. 12, adding macro cells to conventional eNode B deployment is inefficient in terms of cost and complexity relative to improved system performance. A heterogeneous network environment as illustrated in FIG. 12 may be considered.

In FIG. 12, an eNode B that manages and covers a macro cell is defined as a Macro eNode B (MeNB) and a UE operating within a macro cell managed by an MeNB is defined as a Macro UE (MUE). Further, an eNode B that manages and covers a pico cell is defined as a Pico eNode B (PeNB) and a UE operating within a pico cell managed by a PeNB is defined as a Pico UE (PUE). An eNode B that manages and covers a femto cell is defined as a Femto eNode B (FeNB) and a UE operating within a femto cell managed by an FeNB is defined as a Femto UE (FUE).

A plurality of micro cells may be coexist in one macro cell. The micro cells are allocated resources by cell coordination and provide services to UEs using the resources.

As cells having various coverage areas have emerged in the heterogeneous network environment, cell selection and handover need to be more efficiently performed. For example, when signal strength of an MeNB is similar to that of a PeNB, since a pico cell provides a higher data rate than a macro cell, a UE having much data traffic may desirably receive a service from the pico cell. On the other hand, since concentration of too many UEs in the pico cell may deteriorate service quality, a load balancing scheme for properly distributing UEs to the pico cell and the macro cell may be needed.

When taking into consideration such a heterogeneous network environment, cell selection may be performed based on a method for satisfying load balancing without changing actual transmission power. In addition, when an offset is used without actually controlling transmission power in order to maintain load balancing, necessity for a method of compensating for performance degradation generated by inter-cell interference in an expanded cell area is increasing.

The heterogeneous network environment may be configured by a network in which a micro cell is present within coverage of a macro cell. Although usage of the micro cell such as a pico cell or a femto cell is not particularly restricted, generally, the pico cell may be used in a communication shadow area which is not covered by the macro cell alone or an area requiring a large amount of data services, a so-called hot zone. The femto cell may be generally used in, for example, an office or household.

As an example, a cell may be categorized into an Open Access (OA) cell and a Closed Subscriber Group (CSG) cell according to accessibility of a user. The CSG cell is basically intended to be accessible only to members belonging to a CSG. The micro cell may be the OA cell or the CSG cell.

A state of a UE may be classified into an RRC connected state and an RRC idle state according to whether the UE is connected to RRC.

More specifically, in the RRC idle state of the UE, UE-specific Discontinuous Reception (DRX) may be configured by a Non-Access Stratum (NAS). DRX may mean a function for controlling the UE to stop a reception operation and enter a sleep mode in order to reduce power consumption of the UE. In the RRC idle state, the UE may perform cell selection and cell reselection procedures in order to discover a suitable cell as a serving cell for the UE among neighbor cells. In an example, the cell reselection procedure may mean a procedure for moving to the best cell in a state in which the UE performs cell selection.

The UE may monitor System Information (SI) transmitted by a serving cell. The serving cell means a cell on which the UE has camped. Camp-on may mean a state in which the UE monitors SI and paging information after completing cell selection and reselection procedures. The UE may monitor a paging channel in the RRC idle state.

The UE may transition to the RRC connected state from the RRC idle state. In this case, the UE may transmit and receive unicast data. The UE may configure UE-specific DRX defined by a Media Access Control (MAC) layer of an eNB in the RRC connected state and perform operation. The UE may monitor a paging channel, System Information Block Type 1 (SIB1), SI, a control channel, and the like. In this case, the UE may perform monitoring at a cycle different from that of the RRC idle state (generally, at a cycle shorter than that of the RRC idle state). The eNB may transmit information for configuring operation of the UE so as to enable the UE to acquire channel information. The UE may report Channel Quality Information (CQI), measurement information, etc. to the eNB according to the configured information.

If it is determined that signal strength of a neighbor cell (or a target cell) is more proper with respect to the UE relative to signal strength of a current serving cell according to a determined rule based on the information reported by the UE, the eNB may hand over the UE to the neighbor cell. A cell to which the UE is handed over may be another eNB having the same frequency band (hereinafter, an intra-frequency eNB) as the serving cell, the same eNB or another eNB having a different frequency band (hereinafter, an inter-frequency eNB) from the serving cell, or an eNB using a different wireless transmission scheme (hereinafter, inter-Radio Access Technologies (RAT) eNB) from the serving cell.

Figure 13:
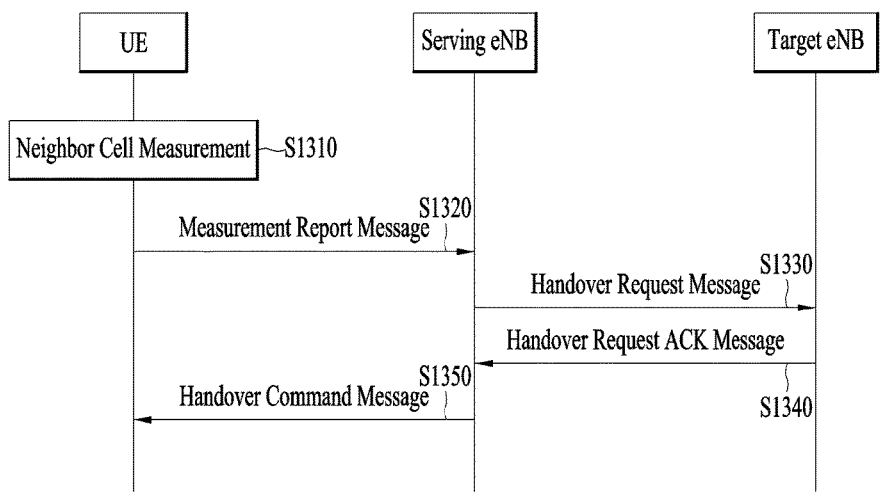
FIG. 13 is a diagram illustrating an exemplary method of performing handover procedure of a UE.

FIG. 13 is a diagram illustrating an exemplary method of performing handover procedure of a UE.

As described above, the UE may be handed over to a neighbor cell from a serving cell based on control of the eNB.

FIG. 13 illustrates an example of a method in which the UE is handed over. More specifically, the UE may perform neighbor cell measurement for handover, cell addition, or cell reselection (S1310). That is, upon generating a handover triggering event while measuring radio channel states of a serving cell and a neighbor cell, the UE may transmit a measurement report message including measurement values to a serving cell (S1320).

Upon receiving the measurement report message for handover from the UE, the serving cell transmits a handover request message to a target cell for handover in order to initiate a handover operation (S1330). The target cell transmits a handover request ACK message in response to the handover request message to the serving cell (S1340). Subsequently, the serving cell transmits a handover command message to the UE and, upon receiving the handover command message, the UE starts a handover operation to the target cell (S1350).

In this case, the UE may measure the following three types of values in the neighbor cell measurement process.

(1) Reference Signal Received Power (RSRP): RSRP is a measurement value capable of being acquired by measuring the magnitude of a cell-specific reference signal in DL. That is, RSRP is a received power value of a desired signal received from a corresponding serving cell.

(2) Received Signal Strength Indicator (RSSI): RSSI is a total reception power value of a signal received by a UE. RSSI is a measurement value including interference and reception noise power of neighbor cells as well as power of a desired signal.

(3) Reference Signal Received Quality (RSRQ): RSRQ is a value measured in the form of. In this case, N is the number of RBs in a corresponding bandwidth during RSSI measurement.

In an example, the triggering event by which the UE transmits the measurement report message to a serving cell may be as follows.

(1) Event A1: Serving cell becomes better than absolute threshold.

(2) Event A2: Serving cell becomes worse than absolute threshold (3) Event A3: Neighbor cell becomes offset better than serving cell.

(4) Event A4: Neighbor cell becomes better than absolute threshold.

(5) Event A5: Serving cell becomes worse than absolute threshold and neighbor cell becomes better than absolute threshold.

For example, the above-described events are disclosed in more detail in 3GPP TS 36.331 and may refer to the contents of 3GPP TS 36.331.

Figure 14:
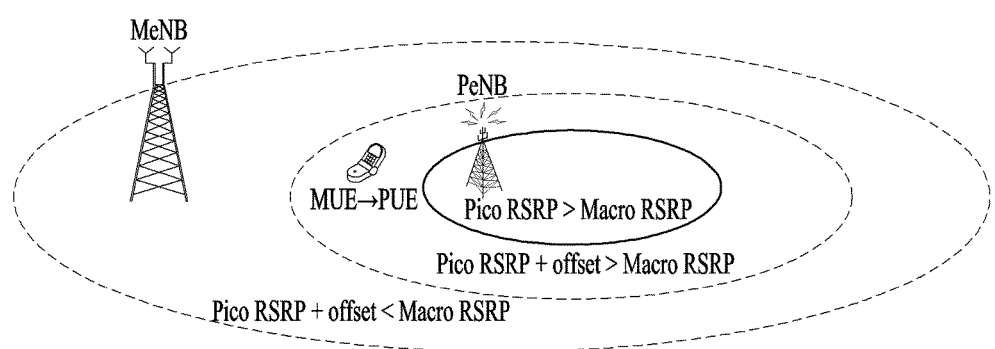
FIG. 14 is a diagram illustrating an example of Cell Range Expansion (CRE).

FIG. 14 is a diagram illustrating an example of Cell Range Expansion (CRE).

CRE refers to increasing cell coverage of a micro cell in order to obtain network load balancing gain. If coverage of the micro cell increases, the number of UEs that can be accommodated within coverage may also increase. Load balancing may be performed when traffic load of multiple cells is unfairly distributed.

A CRE bias may refer to an offset which is added to signal strength of a cell in order to apply CRE. An MUE may be handed over to a micro cell based on Equation 14 indicated below. In more detail, the MUE may be handed over to the micro cell when the condition satisfying Equation 14 is maintained for a predetermined time.

$$S_{mc} + S_b > S_{mm}$$ [Equation 14]

In this case, Smc is signal strength of a micro cell, Smm is signal strength of a macro cell, and Sb is a CRE bias. For example, as Sb increases, a probability that the MUE is handed over to the micro cell increases and coverage of the micro cell is increased.

CRE is technology of handing over, to a PeNB, an MUE which is near to the PeNB and thus experiences severe interference from the PeNB among MUEs connected to an MeNB in a heterogeneous network structure. In a wireless access system, CRE mitigates the effect of existing interference and achieves load balancing between cells within the system, as described above.

More specifically, if a serving cell is simply determined by comparing RSRPs as is conventionally done, the RSRP of an MeNB having high transmission power may be higher than the RSRP of a PeNB having low transmission power in a system structure. In this case, an MUE may not perform handover to the PeNB. Accordingly, it is necessary to implement CRE based on a new criterion as indicated by Equation 15, for reliable CRE in a cell area in which an MeNB is coexist with a PeNB.

$$\text{Pico RSRP} + \text{offset} > \text{Macro RSRP}$$ [Equation 15]

In Equation 14 or 15, an offset is a value set for a UE by higher-layer signaling. With the offset, the UE may perform CRE to a PeNB having low transmission power.

FIG. 14 illustrates an example of CRE technology. Referring to FIG. 14, an MeNB and a PeNB are deployed in a corresponding system. The outermost dotted lines represent a cell area of the MeNB and the innermost solid lines represent a cell area of the PeNB. The middle dotted lines represent an area in which an MUE may perform handover (or CRE) from the cell area of the MeNB to the cell area of the PeNB.

Therefore, if the sum of a pico RSRP of the PeNB and an offset is smaller than a macro RSRP of the MeNB, the MUE continues to receive a service from the MeNB. On the other hand, if the sum of the pico RSRP and the offset is larger than the macro RSRP during RSRP measurement, the MUE performs handover from the MeNB to the PeNB. Thus, the MUE may be changed to a PUE.

As another example, variables used in a handover procedure may be used for the CRE bias. The variables in the handover procedure include Ocn and Ocs. Ocn is a cell-specific offset value added to a measurement value of an adjacent cell and Ocs is a cell-specific offset value added to a measurement value of a serving cell. Default values of Ocn and Ocs may be set to 0 and Ocn and Ocs may be transmitted through an RRC message. If Ocn and Ocs have the same values with respect to a plurality of UEs, Ocn and Ocs may be transmitted through a cell-specific message and, if Ocn and Ocs are configured to have different values with respect to respective UEs, Ocn and Ocs may be transmitted through a UE-specific message.

Figure 15:
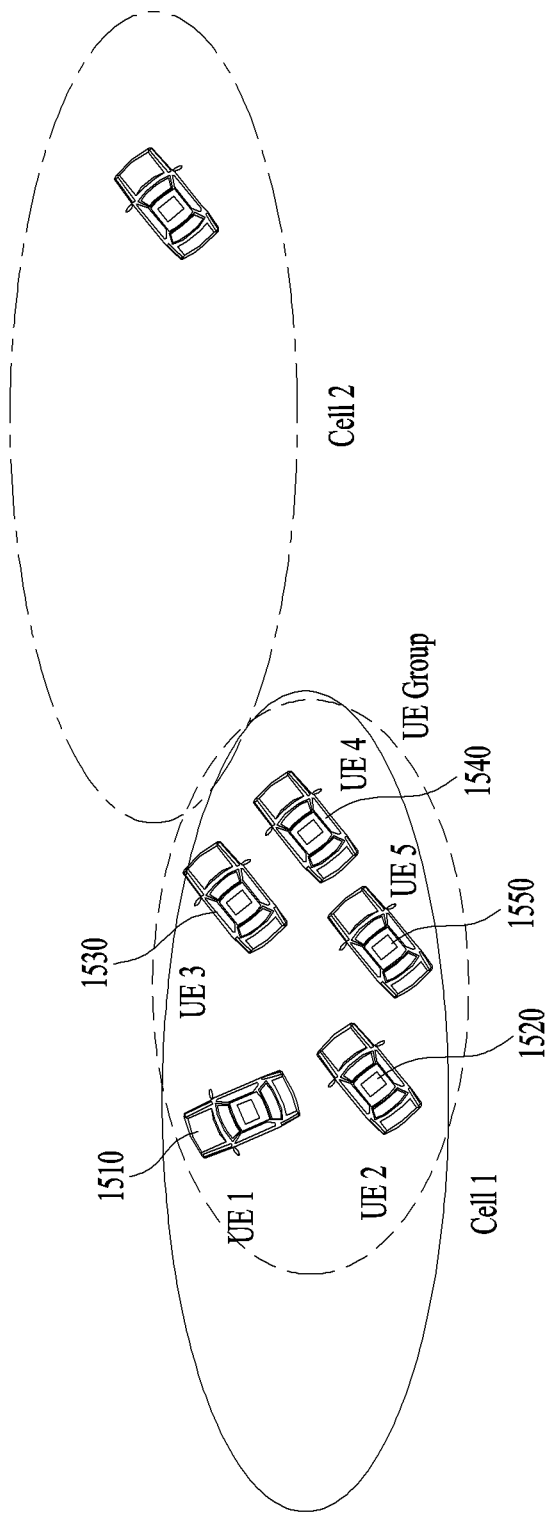
FIG. 15 is a diagram illustrating a method of performing handover in a vehicle-to-vehicle communication system.

FIG. 15 is a diagram illustrating a method of performing handover in a vehicle-to-vehicle communication system.

As described above, communication may be performed based on the vehicle-to-vehicle communication system. Although a description will be given based on a vehicle including a DU, the description may be identically applied to a UE including a plurality of antennas or other devices which include a plurality of antennas and operate based on the antennas, as wireless communication system(s), and is not limited to embodiments described below.

In the vehicle-to-vehicle communication system, a high data rate service needs to be provided. In this case, for example, a plurality of vehicles may be densely located in a narrow area.

The case in which a plurality of vehicles is densely distributed in a narrow area may be caused by traffic jam or other reasons. In the case in which a plurality of vehicles is densely distributed in a narrow area, the dense vehicles tend to move with similar mobility in groups. Then, since the dense vehicles may select the same specific cell, over-traffic may occur in the cell.

As an example, groups of vehicles may be configured in vehicle-to-vehicle communication and handover may be performed in units of groups. Groups of vehicles may be configured based on vehicles having similar vehicular attributes. For example, vehicular attributes may be determined based on at least one of location distribution, demanded traffic capacity, or mobility information of each vehicle. That is, vehicles having similar attributes may be set as one vehicle group and handover may be performed in groups.

However, even when handover is performed in units of groups, if it is necessary to provide a high data rate to each vehicle, an over-traffic problem may occur even when vehicles having similar attributes are handed over in units of groups.

As an example, the above-described CRE technology may be proposed as a method of increasing coverage of a micro cell in order to acquire load balancing gain of a network. However, since the CRE bias is determined by an eNB and is indicated to a vehicle using higher-layer signaling, it may be difficult to dynamically configure the CRE bias. That is, it may be limited to cope with demanded traffic capacity with respect to a plurality of dynamically varying vehicles or each dynamically varying vehicle.

In consideration of the above-described environment, a method is proposed for acquiring a traffic off-loading effect by handing over some vehicles in an over-traffic generated cell to another cell through cooperation between vehicles within a vehicle group.

More specifically, an eNB may set a first bias value for densely distributed vehicles within a vehicle group in one cell through a higher-layer message. As described above, a plurality of vehicles may be set as one vehicle group. The vehicle group may be determined based on at least one of location distribution, demanded traffic capacity, or mobility of each vehicle, as mentioned above. In addition, a vehicle group for multiple vehicles may be configured based on other vehicular properties. In other words, a vehicle group may be a set of vehicles having similar properties and is not limited to the above-described embodiment.

The higher-layer message may be a message transmitted and received through an RRC layer. In this case, for example, when a vehicle is set as an RRC connected state, the vehicle may exchange the higher-layer message with the eNB.

For example, the first bias value may be a bias value for the vehicle group. That is, the first bias value may be a group-dedicated CRE bias value. For example, the first bias value may be equally set for all vehicles in the vehicle group.

As an example, the vehicle group may be configured by the eNB. In this case, the eNB may set the first bias value through a cell-specific message with respect to a plurality of vehicles included in a vehicle group configured thereby. That is, the eNB may provide the same CRE bias value to a plurality of vehicles in the same vehicle group as the group-dedicated CRE bias value.

As another example, the vehicle group may be configured based on vehicle-to-vehicle communication. In this case, information about the vehicle group configured based on vehicle-to-vehicle communication may be reported to the eNB through a representative vehicle or at least one of vehicles in the vehicle group. The eNB may set the first bias value which is the group-dedicated CRE bias value for the vehicle group based on the reported information about the vehicle group.

As another example, plural vehicles in the vehicle group may exchange vehicular attribute information of each of the plural vehicles in the vehicle group. The vehicular attribute information may be information based on at least one of cell signal strength, mobility information, or demanded traffic capacity of each vehicle. In this case, each of the plural vehicles transmits the above information to a representative vehicle of the vehicle group and the representative vehicle may share the information within the vehicle group, so that the information may be exchanged between the vehicles. In addition, for example, the plural vehicles may exchange the information with each other within the vehicle group through cooperative communication. That is, the plural vehicles within the vehicle group may exchange the vehicular attribute information and an information exchange scheme is not limited to the above-described embodiment.

In this case, the representative vehicle may determine a second bias value based on the vehicular attribute information of each of the vehicles and inform each vehicle in the vehicle group of the determined second bias value.

As an example, one or more representative vehicles may be present in one vehicle group. That is, the second bias value for all vehicles in the group may be determined by the one representative vehicle. In an example, a plurality of representative vehicles may configure the second bias value with respect to each of a part of plural vehicles in the group and a second bias value configuration method is not limited to the above-described embodiment. In addition, the second bias value may be a UE-dedicated CRE bias value. That is, the second bias value may be a specific CRE bias value for each of the vehicles in the vehicle group. The second bias value may be differently set with respect to the plural vehicles in the vehicle group. In an embodiment, the second bias value for each of the plural vehicles in the vehicle group may be determined based on vehicular attribute information of each of the plural vehicles. That is, the representative vehicle may receive the vehicular attribute information from each of the vehicles and inform each of the plural vehicles of information about the second bias value.

More specifically, referring to FIG. 15, vehicle 1 (UE 1, 1510), vehicle 2 (UE 2, 1520), vehicle 3 (UE 3, 1530), vehicle 4 (UE 4, 1540), and vehicle 5 (UE 5, 1550) may be set as one vehicle group (or UE group). In an embodiment, an eNB may provide information about a first bias value as group-dedicated CRE bias information to vehicles 1 to 5 (1510, 1520, 1530, 1540, and 1550) in one vehicle group. That is, vehicles 1 to 5 (1510, 1520, 1530, 1540, and 1550) may acquire the information about the same first bias value.

Vehicular attribute information for vehicles 1 to 5 (1510, 1520, 1530, 1540, and 1550) may differ. For example, vehicle 3 to 5 (1530, 1540, and 1550) may have the same mobility and thus vehicular attributes for mobility may be equal. However, vehicle 1 (1510) and vehicle 2 (1520) move in different directions and thus vehicular attributes for mobility may differ. That is, the vehicular attribute information for each of plural vehicles in a vehicle group may be variously configured and is not limited to the above-described embodiment.

If the second bias value, which is the vehicle-dedicated CRE bias value, is set based on mobility of a vehicle, a representative vehicle may determine that vehicles 3 to 5 (1530, 1540, and 1550) requiring a high data rate have almost the same vehicle mobility. That is, in FIG. 15, since vehicles 3 to 5 (1530, 1540, and 1550) among a plurality of densely distributed vehicles in the vehicle group move in the same direction, the second bias value may be set with respect to vehicles 3 to 5 (1530, 1540, and 1550) based on mobility information of the vehicles. In this case, the representative vehicle may acquire vehicular attribute information about each of the plural vehicles in the vehicle group and a vehicular attribute information acquisition method is not limited to the above-described embodiment.

The representative vehicle may set the second bias value corresponding to a different value for each vehicle with respect to vehicle 3 (1530), vehicle 4 (1540), and vehicle 5 (1550) as the vehicle-dedicated CRE bias value in consideration of mobility of vehicles 3 to 5 (1530, 1540, and 1550). For example, the representative vehicle may set the same second bias value for vehicles 3 to 5 (130, 1540, and 1550) under the determination that mobilities of vehicles 3 to 5 (1530, 1540, and 1550) are the time. As another example, the representative vehicle may differently set the second bias value in consideration of a minute mobility difference between vehicles 3 to 5 (1530, 1540, and 1550).

That is, the representative vehicle may set the second bias value with respect to each vehicle and identically or differently set the second bias value based on a vehicular attribute. However, the second bias value set method is not limited to the above-described embodiment. Through this, traffic offloading between cells may be acquired. Equation 16 may indicate a detailed operation of a handover procedure based on the above-described first bias and second bias values.

$$S_{3,1} + G_{3,1} + U_{3,1} < S_{3,2} + G_{3,2} + U_{3,2}$$ [Equation 16]

In this case, $S_{i,j}$ may be a cell signal strength of a j-th cell of an i-th vehicle, $G_{i,j}$ may be a first bias (group-dedicated) value of the j-th cell of the i-th vehicle, and $U_{i,j}$ may be a second bias (UE-dedicated CRE bias) value of the j-th cell of the i-th vehicle.

In an example, a CRE bias value of legacy LTE is expressed as one value ($G_{i,j} + U_{i,j}$) without distinguishing between $G_{i,j}$ and $U_{i,j}$. The above value may be determined by the eNB and may be indicated through RRC signaling.

On the other hand, the first bias value $G_{i,j}$ may be set as the group-dedicated CRE bias value by the eNB as in a conventional manner. In addition, the representative vehicle may set the second bias value $U_{i,j}$ as a different value for each vehicle based on vehicular attribute information of each of plural vehicles according to vehicle-to-vehicle communication. A final CRE bias value may be determined by a combination of the first bias value and the second bias value and each vehicle may determine whether to be handed over to another cell, based on Equation 16.

In an example, plural vehicles in a vehicle group may report attribute information thereof to the eNB and then the eNB may additionally set the second UE-dedicated CRE bias value based on the attribute information and inform the vehicles of the second UE-dedicated CRE bias value.

However, in communication between vehicles having severe dynamic variation, although the above vehicle based scheme may be efficient in order to immediately cope with the demanded traffic capacity of each vehicle in consideration of dynamic variation of the vehicles, the scheme is not limited to the above-described embodiment.

As another example, each vehicle in a vehicle group may set a prescheduled CRE bias offset value based on a vehicle ID indicator (or a UE ID indicator) in the group, assigned to each vehicle, and determine a final vehicle-dedicated CRE bias value based on the CRE bias offset value.

More specifically, each vehicle in the vehicle group may be assigned a unique vehicle ID indicator (or UE ID indicator).

Referring to FIG. 15, while the vehicles in the vehicle group, for example, vehicle 1 and vehicle 2, are distinguished by numbering, a scheme of indicating the vehicles is not limited to the above-described embodiment. That is, indicators for identifying plural vehicles in the vehicle group may be present and the scheme of indicating the vehicles is not limited to the above-described embodiment. In an example, upon configuring the vehicle group, the eNB may configure a vehicle ID indicator and inform each vehicle of the vehicle ID indicator. As another example, after configuring the vehicle group, the eNB may configure the vehicle ID indicator for each vehicle based on cooperative communication between vehicles. That is, indicators for distinguishing between plural vehicles in the vehicle group may be configured and a method of configuring the vehicle ID indicator is not limited to the above-described embodiment.

If a vehicle ID indicator is assigned, each vehicle in a vehicle group may acquire information about the second bias value (UE-dedicated CRE bias) based on the vehicle ID indicator. For example, a mapping table as shown in Table 1 may be configured based on the ID indicator of each vehicle in the plural vehicles in the vehicle group. Each vehicle in the plural vehicles in the vehicle group may receive the first bias value (group-dedicated CRE bias) from the eNB. In addition, each vehicle of the plural vehicles in the vehicle group may receive information about the following mapping table from the representative vehicle and acquire the second bias (UE-dedicated CRE bias value) from the mapping table based on the vehicle ID indicator allocated thereto.

TABLE 1

| Vehicle (or UE) ID indicator | CRE bias offset ($\Delta_i$) |
|---|---|
| 1 | 3 |
| 7 | 5 |
| 3 | 8 |
| 4 | 12 |
| ... | ... |

In a more specific embodiment, the second bias value may be set as a CRE bias offset in Table 1. As an example, a final UE-dedicated CRE bias of a vehicle having a vehicle ID indicator (UE ID indicator) set to i may be determined as indicated in Equation 17.

$$\text{UE-dedicated CRE bias} = G_i + \Delta_i \quad \text{[Equation 17]}$$

In this case, $G_i$ may be a first bias (group-dedicated) value of an i-th vehicle and $\Delta_i$ may be a second bias value (CRE bias offset) of the i-th vehicle.

FIG. 16 is a flowchart illustrating a method of selecting a distributed antenna according to an embodiment of the present invention.

A first vehicle (or UE) may receive information about a first bias value from an eNB (S1610). As described with reference to FIG. 15, the first vehicle may be a vehicle included in a vehicle group. The vehicle group may be configured by the eNB and vehicles having related or similar characteristics may be set as one vehicle group. In this case, the first bias value may be a CRE bias value for the vehicle group. That is, the first bias value may be acquired from the eNB as a value set based on the vehicle group. The first bias value may be equally set for all vehicles in the vehicle group and a first bias value setting method is not limited to the above-described embodiment.

Next, the first vehicle (or UE) may receive information about a second bias value from a second vehicle (or UE) (S1620). As described with reference to FIG. 15, the second vehicle may be a representative vehicle of the vehicle group. The second vehicle may receive vehicular attribute information from each of plural vehicles in the vehicle group and determine the second bias value for each of the plural vehicles based on the attribute information. That is, the second bias value may be differently set with respect to each of the plural vehicles in the vehicle group as a vehicle-specific CRE bias value. For example, the second bias value may be configured by taking into consideration the vehicular attribute information for each of the plural vehicles and a second bias value setting method is not limited to the above-described embodiment.

Next, the first vehicle may perform handover based on the first bias value and the second bias value (S1630). As described with reference to FIG. 15, in the vehicle-to-vehicle communication system, even when handover is performed in units of groups, an over-traffic problem may be present due to vehicles demanding a high data rate. Accordingly, it may be necessary to differently configure the CRE bias value for each of the plural vehicles in the vehicle group based on a vehicular attribute such as mobility of a vehicle. In this case, a final CRE bias value for a vehicle may be determined using the first bias value corresponding to a group-specific value and the second bias value corresponding to an offset value as a vehicle-specific value and a vehicle may perform handover to another cell. Thus, the over-traffic problem can be solved as described above.

FIG. 17 is a block diagram of a UE and a BS according to an embodiment of the present invention.

Although a UE is described as a component of a wireless communication system, the UE may have the same meaning as a vehicle as mentioned previously.

The wireless communication system may include a BS 10 and at least one UE 20. On DL, the BS 10 may be a transmission device and the UE 20 may be a reception device. On UL, the UE 20 may be a transmission device and the BS 10 may be a reception device. The BS 10 may include a processor 11 for controlling each unit of the BS 10, a memory 12 for storing information, and an RF unit 13 for transmitting and receiving a signal. The processor 11 of the BS 10 may be a unit for performing the above-described methods or procedures described with reference to FIGS. 1 to 16. The memory 12 of the BS 10 may be connected to the processor 11 and may store various information controlled by the processor 11. The BS 10 may perform communication with an external device using the RF unit 13. In this case, the external device may be the UE. As an example, the external device may be the above-described vehicle. As another example, the external device may be a fixed device or a device and is not limited to the above-described embodiment. That is, the BS 10 may be a device capable of performing communication with another device corresponding to the external device and is not limited to the above-described embodiment.

The UE 20 may include a processor 21, a memory 22, and an RF unit 23. The processor 21 of the UE 20 may be a unit for performing the above-described methods or procedures described with reference to FIGS. 1 to 16. The memory 22 of the UE 20 may be connected to the processor 21 and may store various information controlled by the processor 21. The UE 20 may perform communication with an external device using the RF unit 23. In this case, the external device may be the BS 10. As an example, the external device may be another vehicle. As another example, the external device may be a fixed device or a device and is not limited to the above-described embodiment. That is, the UE 20 may be a device capable of performing communication with another device corresponding to the external device and is not limited to the above-described embodiment.

For example, the BS 10 and/or the UE 20 may include one or plural antennas. As an example, when at least one of the BS 10 or the UE 20 includes a plurality of antennas, the wireless communication system may be the above-described MIMO system.

In an example, the UE 20 may correspond to the aforementioned vehicle. That is, one vehicle may be one UE 20 and components of the UE 20 may be components included in the vehicle.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the exemplary embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein. In addition, while the present invention has been particularly shown and described with reference to exemplary embodiments thereof, various changes in form and detail may be made herein by those of ordinary skill in the art without departing from the spirit and scope of the present invention as defined by the following claims and such modifications and variations should not be understood separately from the technical idea or aspect of the present invention.

Apparatus and method inventions are mentioned in this specification and descriptions of both the apparatus and method inventions may be complementarily applied to each other.

INDUSTRIAL APPLICABILITY

Although a method of performing handover in a vehicle-to-vehicle communication system and an apparatus therefor have been described based on an example applied to a 3GPP LTE system, the method and apparatus are applicable to various wireless communication systems in addition to the 3GPP LTE system.

The invention claimed is:

1. A method of performing handover by a first User Equipment (UE), the method comprising:
   receiving information about a first bias value from a Base Station (BS);
   receiving information about a second bias value from a second UE; and
   performing handover based on the first bias value and the second bias value,
   wherein the first UE and the second UE are set as the same UE group, and
   the first bias value is a bias value for the UE group and the second bias value is a bias value for the first UE.

2. The method of claim 1, wherein the second UE is a representative UE of the UE group.

3. The method of claim 2, wherein the second UE receives UE attribute information from each of all UEs in the UE group.

4. The method of claim 3, wherein the second UE determines the second bias value for the first UE based on UE attribute information of all the UEs.

5. The method of claim 4, wherein the second UE further determines a bias value of each of all the UEs in the UE group.

6. The method of claim 4, wherein the UE attribute information includes at least one of cell signal strength, traffic information, or mobility information.

7. The method of claim 1, wherein the first bias value is transmitted to the first UE through a higher-layer message.

8. The method of claim 7, wherein the first bias value is transmitted to all UEs in the UE group and is equally set for all the UEs in the UE group.

9. The method of claim 1, wherein the UE group is configured based on at least one of UE location distribution, demanded traffic capacity, or mobility.

10. The method of claim 9, wherein the UE group is set by the BS.

11. The method of claim 1, wherein the second bias value is set based on a first ID indicator and the first ID indicator indicates the first UE in the UE group.

12. The method of claim 11, wherein an ID indicator indicating each UE is allocated to each of UEs in the UE group and the ID indicator for each of the UEs is allocated by the BS or the second UE.

13. The method of claim 11, wherein the information about the second bias value is information configured by a mapping table including the first ID indicator, and the second bias value and the first UE acquires the information about the second bias value based on the first ID indicator from the information configured by the mapping table.

14. A first User Equipment (UE) for performing handover, the first UE comprising:

a transceiver module configured to transmit and receive information to and from an external device; and a processor configured to control the transceiver module, wherein the processor receives, from a Base Station (BS), information about a first bias value through the transceiver module, receives, from a second UE, information about a second bias value through the transceiver module, and performs handover based on the first bias value and the second bias value, wherein the first UE and the second UE are set as the same UE group, and wherein the first bias value is a bias value for the UE group and the second bias value is a bias value for the first UE.

15. The first UE of claim 14, wherein the second UE is a representative UE of the UE group.

* * * * *